(12) United States Patent
Shin, Jr.

(10) Patent No.: US 12,505,920 B2
(45) Date of Patent: Dec. 23, 2025

(54) SMART DIAGNOSIS SYSTEM AND METHOD

(71) Applicant: David Sung Joon Shin, Jr., Seoul (KR)

(72) Inventor: David Sung Joon Shin, Jr., Seoul (KR)

( * ) Notice: Subject to any disclaimer, the term of this patent is extended or adjusted under 35 U.S.C. 154(b) by 532 days.

(21) Appl. No.: 17/787,589

(22) PCT Filed: Dec. 14, 2020

(86) PCT No.: PCT/KR2020/018232
§ 371 (c)(1),
(2) Date: Jun. 21, 2022

(87) PCT Pub. No.: WO2021/125719
PCT Pub. Date: Jun. 24, 2021

(65) Prior Publication Data
US 2022/0415490 A1 Dec. 29, 2022

(30) Foreign Application Priority Data
Dec. 19, 2019 (KR) .................. 10-2019-0171184

(51) Int. Cl.
*G16H 40/20* (2018.01)
*G06Q 10/02* (2012.01)
(Continued)

(52) U.S. Cl.
CPC .............. *G16H 40/20* (2018.01); *G06Q 10/02* (2013.01); *G16H 20/10* (2018.01); *G16H 80/00* (2018.01); *H04W 4/023* (2013.01); *H04W 4/025* (2013.01)

(58) Field of Classification Search
CPC ........ G16H 40/20; G16H 20/10; G16H 80/00; G16H 20/00; G06Q 10/02; H04W 4/023; H04W 4/025; G06F 3/0484
(Continued)

(56) References Cited

U.S. PATENT DOCUMENTS 11,327,943 B2   5/2022   Lee
2008/0162254 A1*  7/2008  Herger ................ G16H 40/63
                                                        705/2
(Continued)

FOREIGN PATENT DOCUMENTS

JP   2015-195026 A   11/2015
JP   2016-110247 A    6/2016
(Continued)

OTHER PUBLICATIONS

Maki, Shikatani; Decision to Grant a Patent issued in JP Patent Application No. 2022-538458; Aug. 8, 2023; 3 pages including English translation.
(Continued)

*Primary Examiner* — Jason B Dunham
*Assistant Examiner* — Kimberly A. Sass
(74) *Attorney, Agent, or Firm* — Frost Brown Todd LLP

(57) ABSTRACT

Disclosed is an application which is stored in a computer-readable medium and executes an operation of a terminal device. An operation performed in the present application comprises the steps of: providing a UI screen for receiving an input of symptom information; when a user's symptom information is input through the UI screen, transmitting the symptom information and a waiting number request to a hospital management server; receiving a waiting number corresponding to the waiting number request from the hospital management server, and providing the UI screen including the received waiting number; transmitting the user's identification information to an application server; and controlling the application server to transmit the user's identification information to the hospital management server.

8 Claims, 31 Drawing Sheets

(51) Int. Cl.
    *G16H 20/10* (2018.01)
    *G16H 80/00* (2018.01)
    *H04W 4/02* (2018.01)
(58) Field of Classification Search
    USPC ............................................................. 705/2
    See application file for complete search history.

(56) References Cited

U.S. PATENT DOCUMENTS

| | | | | |
|---|---|---|---|---|
| 2018/0314802 | A1* | 11/2018 | Dreyer | .................... G16H 40/63 |
| 2020/0211701 | A1* | 7/2020 | Martindale | ............ G16H 10/60 |

FOREIGN PATENT DOCUMENTS

| | | | |
|---|---|---|---|
| JP | 2017-188074 A | 10/2017 | |
| KR | 1020090000196 A | 1/2009 | |
| KR | 101142568 B1 | 4/2012 | |
| KR | 101200814 B1 | 11/2012 | |
| KR | 1020130082641 A | 7/2013 | |
| KR | 1020140029015 A | 3/2014 | |
| KR | 10-2015-0021418 A | 3/2015 | |
| KR | 1020150134555 A | 12/2015 | |
| KR | 1020160011033 A | 1/2016 | |
| KR | 1020160144570 A | 12/2016 | |
| KR | 1020160148818 A | 12/2016 | |
| KR | 101720268 B1 | 3/2017 | |
| KR | 1020170029987 A | 3/2017 | |
| KR | 10-2018-0009478 A | 1/2018 | |
| KR | 1020180075298 A | 7/2018 | |
| KR | 101948091 B1 | 2/2019 | |
| KR | 20190107905 A * | 9/2019 | ........... G06F 16/951 |
| WO | WO-2021199275 A1 * | 10/2021 | ............. G06Q 10/06 |

OTHER PUBLICATIONS

Notice of Allowance issued in Korean Patent Application No. 10-2021-0133168; Apr. 22, 2024; 3 pages, including English translation.
Office Action issued in related Korea Patent Application No. 10-2019-0171184; Nov. 11, 2020; 15 pages.
Office Action issued in related Korea Patent Application No. 10-2019-0171184; Mar. 29, 2021; 13 pages.
Office Action issued in related Korea Patent Application No. 10-2019-0171184; Nov. 16, 2020; 15 pages.
Decision to Grant a Patent issued in related Korea Patent Application No. 10-2019-0171184; Aug. 30, 2021; 6 pages.
International Search Report and Written Opinion of the International Searching Authority issued in International Application No. PCT/KR2020/018232; Mar. 22, 2021; 13 pages.

* cited by examiner

| DATE | HOSPITAL | DEPARTMENT | NAME OF DISEASE |
|---|---|---|---|
| 19-06-01 | B HOSPITAL | DERMATOLOGY | ALLERGY |
| 19-07-01 | B HOSPITAL | DERMATOLOGY | ALLERGY |
| 19-08-01 | B HOSPITAL | DERMATOLOGY | ALLERGY |
| 19-09-01 | B HOSPITAL | DERMATOLOGY | ALLERGY |
| 19-09-15 | C HOSPITAL | INTERNAL MEDICINE | COLD |
| 19-10-01 | B HOSPITAL | DERMATOLOGY | ALLERGY |
| 19-10-15 | C HOSPITAL | INTERNAL MEDICINE | COLD |
| 19-10-30 | A HOSPITAL | ORTHOPEDICS | FRACTURE |

1110

| | HOSPITAL | DEPARTMENT | NAME OF DISEASE |
|---|---|---|---|
| RECENT VISIT | A HOSPITAL | ORTHOPEDICS | FRACTURE |
| MOST VISIT | B HOSPITAL | DERMATOLOGY | ALLERGY |
| PAST VISIT | C HOSPITAL | INTERNAL MEDICINE | COLD |

SMART DIAGNOSIS SYSTEM AND METHOD

TECHNICAL FIELD

This disclosure relates to a smart diagnosis (or treatment, hereinafter "treatment") system and a method thereof and, more particularly to, a smart treatment system for separately managing personal identification information and personal symptom information and a method thereof.

BACKGROUND ART

A patient's waiting time may be longer when visiting a hospital. The reason for longer waiting time may be that treatment time for a patient in one hospital may be lengthened or that there are more patients visiting.

To reduce waiting time, it is necessary to shorten the hours of treatment of a large number of patients and doctors. In order to shorten the treatment time of a patient and the doctor, it may be helpful to gather information in advance that the patient is repeatedly asked. Specifically, the doctor in charge or hospital may collect information in advance about the reason the patient visited the hospital and specifically the patient visited the hospital for what symptoms to shorten the time of the treatment. Here, a smart treatment system may be used for effective hospital operation and patient accessibility, and various services of the hospital may be provided to patients through an application for the operation of the smart treatment system. The hospital may request personal information about the patient through the application. However, if the patient's personal information is collected through the application, the patient's personal information may be highly likely leaked through the application server. The patients may be reluctant to fill in their personal information through an application, and hospitals may have the problem of avoiding receiving personal information (e.g., symptom information) because of the issue of liability for the leakage of personal information. In addition, even if information about the prescription is provided to the patient, there is a possibility that the personal information may be leaked, and there may be a problem that both the patient and the hospital may avoid providing the prescription information.

If there are more patients visiting the hospital, a reservation system may be introduced to disperse the patient's visiting time. However, there may be cases where patients not visiting at the scheduled time may increase after the reservation is confirmed. If there are more no-show patients who do not visit at the scheduled reservation time, or if there are patients who requests treatment on the same day without a reservation, the complexity of determining the order of reception or treatment of the hospital may increase. For hospitals, determining whether patients will visit at the scheduled time may play an important role in reducing patients' waiting times. If patients are asked directly over the phone before the scheduled time if they would normally visit, duties of a person responsible for the telephone work may increase, which may cause increased labor costs. Therefore, when a smart treatment system provides a reservation function, determining exactly whether the reservation patients will actually arrive at the hospital may help manage an efficient treatment system.

DISCLOSURE

Technical Problem

It is an object of the disclosure to address the above-mentioned problems, and provide an application and a terminal device including the application for separating and transmitting personal identification information and personal symptom information to a separate device, and determining whether reserved patients have actually visited the hospital to solve a problem of complexity in determining a treatment order.

Technical Solution

An application stored in a computer-readable medium and executes an operation of a terminal device, wherein the operation may include transmitting, to a hospital management server, a reservation request and user's identification information through an application server; providing a user interface (UI) screen for receiving symptom information; based on a user's symptom information being input through the UI screen, transmitting the symptom information and a waiting number request to the hospital management server; receiving a waiting number corresponding to the waiting number request from the hospital management server and providing the UI screen including the received waiting number; and transmitting, to the hospital management server, the received waiting number through the application server, and the user's identification information is included in patient information generated by the hospital management server.

A first UI screen including the symptom information transmitted to the hospital management server based on the mapped patient information and the waiting person information and a second UI screen including the user's identification information may be provided to a display device communicating with the hospital management server.

The operation may further include providing a UI screen for hospital reservation;

based on receiving a reservation request through the UI screen for hospital reservation, transmitting, to the hospital management server, the reservation request and the user's identification information through the application server; and based on receiving hospital reservation information from the hospital management server through the application server, providing a UI screen including the received hospital reservation information, and the reservation information may include a reservation time.

The operation may further include transmitting, to the hospital management server, location information of the terminal device prior to a threshold time from the reservation time; and based on receiving a waiting number corresponding to the location information from the hospital management server, providing a UI screen including the received waiting number.

The hospital management server, based on the location information being within a threshold distance from the location of the hospital, may provide a waiting number with a high priority to the terminal device.

The operation may further include transmitting the received waiting number to the application server and controlling the application server to transmit the waiting number to the hospital management server, and the first UI screen including the symptom information and the waiting number transmitted to the hospital management sever based on the mapped patient information and the waiting person information and the second UI screen including the user's identification information and the waiting number may be provided to a display device communicating with the hospital management server.

The operation may further include receiving prescription information from the hospital management server; and providing a UI screen including the received prescription information, and the hospital management server may identify a terminal device for transmitting the prescription information based on the waiting number, and transmit the prescription information to the identified terminal device.

The hospital management server may include a first hospital management server and a second hospital management server, the symptom information and the waiting number request may be transmitted to the first hospital management server, and the user's identification information may be transmitted to the second hospital management server.

The symptom information may be transmitted to the hospital management server by using a first communication module of the terminal device, and the user's identification information may be transmitted to the hospital management server through the application server using a second communication module of the terminal device.

The operation may further include receiving prescription information from the hospital management server; and providing a UI screen including the received prescription information, and the prescription information may be received from the hospital management server through the first communication module.

According to an embodiment, a terminal device includes a memory for storing an application, a display, a communication interface, and a processor for executing the application to perform an operation, and the operation includes displaying a UI screen for receiving symptom information on the display, when the user's symptom information is input through the UI screen, transmitting the symptom information and the waiting number request to the hospital management server, receiving a waiting number corresponding to the waiting number request from the hospital management server, and displaying the UI screen including the received waiting number on the display, transmitting the user's identification information to the application server, and controlling the application server to transmit the user's identification information to the hospital management server.

The processor may provide a first UI screen including the symptom information transmitted to the hospital management server and a second UI screen including the user's identification information to a display device communicating with the hospital management server.

The processor may, based on information for a hospital reservation being input through the UI screen, transmit the user's identification information and the information for the hospital reservation to the application server, and based on receiving the hospital reservation information from the application server, display the UI screen including the received hospital reservation information on the display, and the reservation information may include a reservation time.

The processor may transmit, to the hospital management server, location information of the terminal device prior to a threshold time from the reservation time; and based on receiving a waiting number corresponding to the location information from the hospital management server, display a UI screen including the received waiting number.

The hospital management server, based on the location information being within a threshold distance from the location of the hospital, may provide a waiting number with a high priority to the terminal device.

The processor may transmit the received waiting number to the application server through the communication interface, and may control the application server to transmit the waiting number to the hospital management server, and a first UI screen including the symptom information and the waiting number transmitted to the hospital management server and a second UI screen including the user's identification information and the waiting number may be provided to a display device communicating with the hospital management server.

The processor may receive prescription information from the hospital management server and display a UI screen including the received prescription information on the display, and the hospital management server may identify a terminal device for transmitting the prescription information based on the waiting number, and transmit the prescription information to the identified terminal device.

The hospital management server may include a first hospital management server and a second hospital management server, the symptom information and the waiting number request may be transmitted to the first hospital management server, and the user's identification information may be transmitted to the second hospital management server.

The symptom information may be transmitted to the hospital management server by using a first communication module of the terminal device, and the user's identification information may be transmitted to the hospital management server through the application server using a second communication module of the terminal device.

The processor may receive prescription information from the hospital management server, and display a UI screen including the received prescription information, and the prescription information may be received from the hospital management server through the first communication module.

DESCRIPTION OF DRAWINGS

FIG. 11 is a diagram illustrating an embodiment of performing a reservation step using past history information;

BEST MODE FOR CARRYING OUT THE INVENTION

Figure 1:
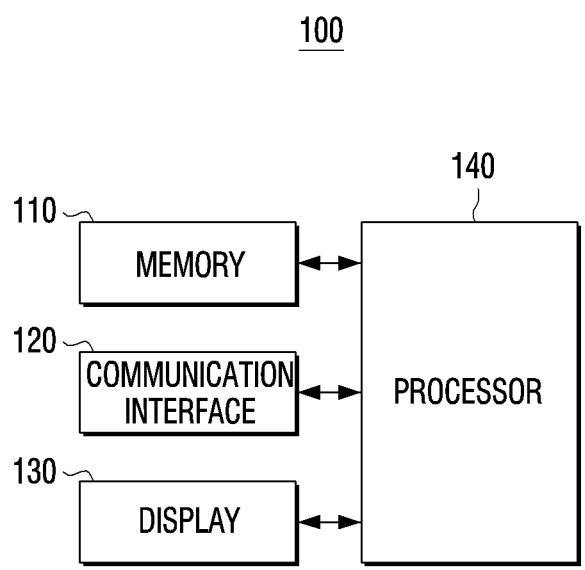
FIG. 1 is a block diagram illustrating a user terminal device according to an embodiment of the disclosure.

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

In the disclosure, a "user" may refer to a person using an electronic apparatus or an artificial intelligence electronic apparatus using an electronic apparatus (e.g., artificial intelligence electronic apparatus).

Hereinafter, an embodiment will be described in greater detail with reference to the attached drawings.

FIG. 1 is a block diagram illustrating a user terminal device according to an embodiment of the disclosure.

Referring to FIG. 1, a user terminal device 100 may include a memory 110, a communication interface 120, a display 130, and a processor 140.

The memory 110 may be implemented as an internal memory such as, for example, and without limitation, a read-only memory (ROM) (for example, electrically erasable programmable read-only memory (EEPROM)), a random-access memory (RAM) or a memory separate from the processor 140. In this case, the memory 110 may be implemented as at least one of a memory embedded within the user terminal device 100 or a memory detachable from the user terminal device 100 according to the usage of data storage. For example, the data for driving the user terminal device 100 may be stored in the memory embedded within the user terminal device 100, and the data for upscaling of the user terminal device 100 may be stored in the memory detachable from the user terminal device 100.

The memory 110 may store an application used for smart treatment system. The application stored in the memory 110 may provide a user with a hospital reservation function. The application stored in the memory 110 may be updated with a preset cycle, and the application may provide a user with various functions using the processor 140.

The communication interface 120 may include various communication circuitry and communicate with other external devices using various types of communication methods. The communication interface 120 may include, for example, and without limitation, a Wi-Fi module, a Bluetooth module, an infrared communication module, a wireless communication module, or the like. Each communication module may be implemented as at least one hardware chip.

A Wi-Fi module and a Bluetooth module perform communication by using a Wi-Fi method and a Bluetooth method, respectively. In the case of using a Wi-Fi module or a Bluetooth module, various types of connection information such as an S SID and a session key is transmitted and received first, and connection of communication is performed by using the information, and various types of information may be transmitted and received thereafter.

An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

The communication interface 120 may include at least one of a local area network (LAN) module, Ethernet module, or wired communication module performing communication using a pair cable, a coaxial cable, an optical cable, or the like.

According to an embodiment, the communication interface 120 may use the same communication module (for example, Wi-Fi module) for communicating with an external device such as a remote controller and an external server.

According to another example, the communication interface 120 may use a different communication module (for example, a Wi-Fi module) to communicate with an external server and an external device such as a remote controller. For example, the communication interface 120 may use at least one of an Ethernet module or a Wi-Fi module to communicate with the external server, and may use a Bluetooth (BT) module to communicate with an external device such as a remote controller. However, this is only an example and the communication interface 120 may use at least one communication module among various communication modules when communicating with a plurality of external devices or external server.

The display 130 may be implemented as displays in various forms such as a liquid crystal display (LCD), an organic light emitting diode (OLED) display, and a plasma display panel (PDP). Inside the display 130, driving circuits that may be implemented in forms such as an a-si TFT, a low temperature poly silicon (LTPS) TFT, and an organic TFT (OTFT), etc., and a backlight unit and the like may also be included together. In addition, the display 130 may also be implemented as a touch screen coupled with a touch sensor, a flexible display, a 3D display, etc.

According to an embodiment, the display 130 may include not only a display panel to output an image but also a bezel that houses a display panel. In particular, the bezel according to an embodiment may include a touch sensor (not illustrated) for sensing a user interaction.

The processor 140 may perform an overall control operation of the terminal device. The processor 140 may perform a function to control overall operations of a terminal device.

The processor 140 may be implemented with at least one of a digital signal processor (DSP), a microprocessor, and a time controller (TCON). The processor 140 is not limited thereto and may include at least one or more of a central processing unit (CPU), a micro controller unit (MCU), a micro processing unit, a controller, an application processor (AP), a communication processor (CP), and an advanced reduced instruction set computing (RISC) machine (ARM) processor or may be defined as a corresponding term. The processor 140 may be implemented in a system on chip (SoC) type or a large scale integration (LSI) type in which a processing algorithm is built therein or in a field programmable gate array (FPGA) type. The processor 140 may perform various functions by executing computer executable instructions stored in the memory 110.

The user terminal device 100 may include the processor 140 for executing an application and performing an operation.

Specifically, the processor 140 may display a UI screen for receiving the symptom information on the display 130. The symptom information may refer to information related to the symptom of a patient using the user terminal device 100. For example, the symptom information may include a body portion (left wrist) and a pain type (numbness). Further, the symptom information may be input by a user based on a UI screen displayed on the display 130. Here, the user may refer to a patient. The symptom information may be input through the user interface 150 of the user terminal device 100. There may be various conditions regarding when the processor 140 displays a UI screen for receiving the symptom information. For example, the processor 140 may display a UI screen for receiving the symptom information on the display 130 when receiving the reservation information from the application server 200. As another example, the processor 140 may display a UI screen for receiving the symptom information on the display 130 when the application is executed by the user. Based on various preset events, the processor 140 may display a UI screen for receiving the symptom information on the display 130.

When the user symptom information is input through the UI screen, the processor 140 may transmit the symptom information and the waiting number request to the hospital management server 300. The waiting number request may mean that a patient requests to receive a reception order to receive checkup or treatment from a doctor in a hospital. The order of reception may mean the order in which the patient actually receives the waiting number, and the treatment order may mean the order in which the patient actually receives the treatment. Although the reception order and the treatment order are generally the same, the reception order and treatment order may be different in accordance with cases.

When receiving a waiting number request from the user terminal device 100, the hospital management server 300 may allocate the waiting number to the user terminal device 100 and transmit the allocated waiting number to the user terminal device 100. The hospital management server 300 may map the user terminal device 100 transmitting the waiting number request with the waiting number and store the mapped waiting number in the memory of the hospital management server 300. The hospital management server 300 may map and store a terminal device corresponding to a specific waiting number. When the waiting number and the user terminal device 100 are mapped, the hospital management server 300 may map the waiting number and the symptom information of the user terminal device 100. The hospital management server 300 may store the symptom information as symptom information corresponding to the waiting number without storing the symptom information as information about a specific patient. The reason why the symptom information is stored by mapping (grouping) with the waiting number is not to accurately store to which patient the symptom information belongs. By not storing the symptom information of a specific patient, it is possible to be braced for personal information leakage. Further, the symptom information is of whom may be stored in the patient information after checking the doctor's confirmation such as a medical checkup, in the current medical action. The detailed operation of this is described below.

The processor 140 may receive a waiting number corresponding to the waiting number request from the hospital management server 300, and may display a UI screen including the received waiting number on the display 130. The user may determine the treatment order based on the waiting number displayed on the display 130. The processor 140 may further display at least one of the date information, the resident registration number, the waiting personnel, the waiting place, and the expected waiting time, in addition to the waiting number in the display 130.

The processor 140 may transmit the identification information of the user to the application server 200. The identification information may mean information that may specify a user. For example, the identification information may include at least one of a name, a birth date, an application subscription ID, a patient number stored in the hospital such as a medical insurance number, a passport number, and the like. The processor 140 may transmit only the identification information to the application server 200 except for the symptom information. In addition, the processor 140 may generate a control command to control the application server 200 to transmit the identification information of the user to the hospital management server 300. The processor 140 may transmit the control command and the identification information to the application server 200. The processor 140 may separately manage the identification information and the symptom information. Specifically, the processor 140 may transmit the identification information to the application server 200 and transmit the symptom information directly to the hospital management server 300. As a result, both the identification information and the symptom information are transmitted to the hospital management server 300, but the symptom information may not pass through the application server 200. Therefore, the symptom information may not be leaked even when the application server 200 is hacked.

A first UI screen including symptom information transmitted to the hospital management server 300 and a second UI screen including user's identification information may be provided to a display device 600 (FIG. 24) communicating with the hospital management server 300.

The hospital management server 300 may receive symptom information from the user terminal device 100. The hospital management server 300 may receive the identification information from the application server 200. The hospital management server 300 may generate a first UI screen including symptom information, and transmit information corresponding to the generated first UI screen to the display device 600. The hospital management server 300 may generate a second UI including identification information, and transmit information corresponding to the generated second UI to the display device 600. The display device 600 receiving the information on the first UI screen and the second UI screen may display the first UI screen and the second UI screen at the same time on the display of the display device 600.

The first UI screen may include at least one of symptom information of a user (patient) and a waiting number. The symptom information and the waiting number may be referred to as waiting person information. The first UI screen may be a screen displayed on a second area 2410 of FIG. 24.

The second UI screen may include at least one of the identification information of the user (patient) and the medical history information. The identification information and the medical history information may be referred to as patient information. The second UI screen may be a screen displayed on a first area 2405 of FIG. 24.

The display device 600 may mean an electronic apparatus including a display connected to the hospital management server 300. For example, the display device 600 may mean a personal computer (PC) of the doctor connected to the hospital management server 300.

When the information for the hospital reservation is input through the UI screen, the processor 140 may transmit the user's identification information and the information for the hospital reservation to the application server 200, and when the hospital reservation information is received from the application server 200, the UI screen including the received hospital reservation information may be displayed on the display, and the reservation information may include the reservation time.

The processor 140 may provide various UI to the user through the display included in the user terminal device 100. The user terminal device 100 may display a UI screen requesting the user to enter information for hospital reservation on the display. The information for a reservation may mean at least one of the following conditions: the hospital, the department, the hours of treatment, and the doctor in charge. When the processor 140 receives information for a hospital reservation through the user interface included in the user terminal device 100, the processor 140 may transmit information for the received hospital reservation and the unique identification information of the user terminal device 100 to the application server 200. The identification information transmitted to the application server 200 may mean personal identification information such as the name, social security number, patient number, etc. of the user (patient) using the user terminal device 100. If the personal identification information of the user terminal device 100 is stored in the application server 200, the user terminal device 100 may be implemented in a form that does not transmit the identification information to the application server 200.

The application server 200 may receive information for hospital reservation and identification information from the user terminal device 100 and transmit information for hospital reservation and identification information to the hospital management server 300. In addition, the hospital management server 300 may generate hospital reservation information based on information and identification information for the received hospital reservation. The generated hospital reservation information may then be transmitted to the application server 200. The application server 200 may transmit hospital reservation information received from the hospital management server 300 to the user terminal device 100. The user terminal device 100 may display a UI screen including the received hospital reservation information on the display of the user terminal device 100. Here, the hospital reservation information may include at least one of the hospital, the medical department, the time of treatment (reservation time), or the doctor in charge.

According to an embodiment, the user terminal device 100 may be implemented in the form of simultaneously receiving the reservation information and the waiting number from the hospital management server 300. In addition, according to another embodiment, the user terminal device 100 may be implemented in the form of first receiving reservation information from the hospital management server 300 and thereafter receiving a waiting number.

A specific operation related to reservation will be described with reference to FIGS. 10 to 14.

The processor 140 may transmit the location information of the user terminal device 100 to the hospital management server 300 prior to the threshold time from the reservation time, and upon receiving the waiting number corresponding to the location information from the hospital management server 300, the UI screen including the received waiting number may be displayed on the display.

If the location information is within a critical distance from the location of the hospital, the hospital management server 300 may provide the waiting number with high ranking to the user terminal device 100.

A specific operation related to the location information and the waiting number will be described with reference to FIGS. 15 to 19.

The processor 140 may transmit the received waiting number to the application server 200 through a communication interface and may control the application server 200 to transmit the identification information and waiting number to the hospital management server 300.

As described above, the symptom information received by the user terminal device 100 may be mapped (grouped) to the waiting number and stored in the memory of the hospital management server 300. The hospital management server 300 may not know to whom the received symptom information belongs, and may simply store information that corresponds to a specific waiting number. Accordingly, the user terminal device 100 may transmit only the waiting number to the application server 200. The user terminal device 100 may transmit the waiting number assigned to the user terminal device 100 to the application server 200, and the application server 200 may transmit the waiting number assigned to the user terminal device 100 to the hospital management server 300. The hospital management server 300 may receive the waiting number allocated to the user terminal device 100, and determine that the symptom information corresponding to the specific waiting number is for the user terminal device 100. The operation of transmitting the assigned waiting number to the application server 200 will be described later in S2170 of FIG. 21.

As described above, in order to prevent personal information leakage, the hospital management server 300 may not combine the symptom information with the identification information. The hospital management server 300 may combine the symptom information with the waiting number to specify the symptom information. The hospital management server 300 may receive the identification information and the waiting number from the application server 200.

As an example, the hospital management server 300 may receive the identification information and the waiting number from the application server 200 at the same time. As another example, the hospital management server 300 may first receive the identification information from the application server 200 and then receive the waiting number from the application server 200.

A specific operation will be described with reference to FIGS. 20 to 24.

The first UI screen including the symptom information and the waiting number transmitted to the hospital management server 300 and the second UI screen including the identification information and the waiting number of the user may be provided to the display device 600 in communication with the hospital management server 300.

The hospital management server 300 may receive the symptom information directly from the user terminal device 100, and the hospital management server 300 may combine the waiting number assigned to the user terminal device 100 with the symptom information and store the information. The hospital management server 300 may combine and store the identification information and the waiting person information received from the application server 200. Although the hospital management server 300 receives both the symptom information and the identification information, the symptom information may be received from the user terminal device 100, and the identification information may be received from the application server 200. The application server 200 may store only the identification information, and may not store any of the symptom information. So, if the application server 200 is hacked, the symptom information of a user using the user terminal device 100 may not be leaked.

The hospital management server 300 may generate a first UI screen including the symptom information and the waiting number corresponding to the symptom information, and transmit the generated first UI screen to the display device 600. The hospital management server 300 may generate a second UI screen including identification information and a waiting number corresponding to the identification information, and transmit the generated second UI screen to the display device 600.

The processor 140 may receive prescription information from the hospital management server 300, and may display a UI screen including the received prescription information on the display. In this case, the prescription information may refer to information about the treatment result for a patient that is input by the doctor. The hospital management server 300 may identify the user terminal device 100 to transmit prescription information based on the waiting number, and transmit prescription information to the identified user terminal device 100. The detailed operation associated with the prescription step will be described later with reference to FIGS. 27 to 30.

The hospital management server 300 may include a first hospital management server and a second hospital management server, and the symptom information and the waiting number request may be transmitted to the first hospital management server, and the identification information of the user may be transmitted to the second hospital management server.

Figure 7:
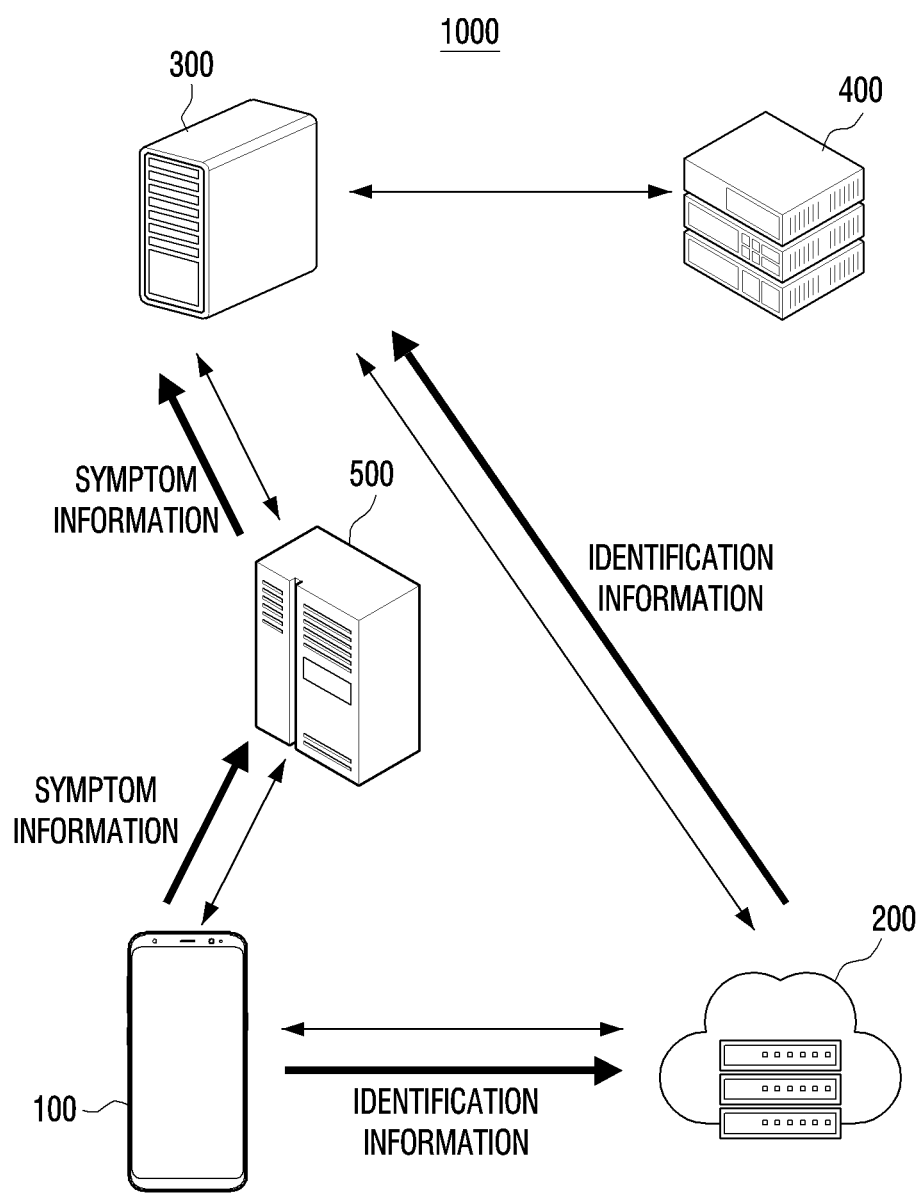
FIG. 7 is a diagram illustrating a patient treatment system according to still another embodiment of the disclosure.

Here, the first hospital management server may refer to the hospital management server 300 and the reception management server 500 of FIG. 7. The second hospital management server may refer to the hospital management server 300 and the EMR server 400 of FIG. 7. The symptom information and the waiting number request may be transmitted to the hospital management server 300 via the reception management server 500. The identification information may be transmitted to the EMR 400 via the hospital management server 300. The reception management server 500 and the EMR server 400 will be described later with reference to FIGS. 7 to 8.

The symptom information may be transmitted to the hospital management server 300 through the first communication module and the identification information of the user may be transmitted to the hospital management server 30 through the second communication module.

The user terminal device 100 may transmit information to the hospital management server 300 using a different communication method in order to prevent the symptom information and the identification information from being leaked together. For example, the processor 140 may transmit the symptom information to the hospital management server 300 using a near field wireless communication method. The near field communication method may refer to at least one of Bluetooth, Wi-Fi, ZigBee, near field communication (NFC), and infrared rays. The processor 140 may transmit the identification information to the hospital management server 300 using another communication method other than the communication method used for the transmission of the symptom information. The processor 140 may transmit the identification information to the hospital management server 300 through the mobile communication network. The mobile communication network may refer to various wireless communication networks, such as Long Term Evolution (LTE), LTE-advanced (LTE-A), 4th Generation (4G), 5th Generation (5G), and the like.

The processor 140 may receive prescription information from the hospital management server 300, display a UI screen including the received prescription information on a display, and the prescription information may be received from the hospital management server 300 through the first communication module.

The prescription information may refer to a treatment specification. The treatment specification may include at least one of a type of a medicine, an examination item, or a treatment item.

The prescription information may be personal information that is sensitive like symptom information. Thus, the prescription information may be combined with the identification information to prevent personal information leakage and not be transmitted to the user (patient). Where the prescription information and the identification information are combined and stored may be an EMR server 400 in which stability is secured. The hospital management server 300 may group and store prescription information together with a waiting number. Even if the prescription information and the waiting number are leaked together, it is hard to know to whom the prescription information belongs. Accordingly, the hospital management server 300 may transmit the prescription information to the user terminal device 100 using the first communication module using the first communication module to receive the symptom information.

The processor 140 may delete the received waiting number based on a predetermined condition. For example, the processor 140 may delete the waiting number after a threshold time has elapsed from the time point at which the waiting number has been received. As another example, the processor 140 may delete the waiting number based on the date information included in the waiting number. The waiting number may include date information, and the processor 140 may compare the date information included in the waiting number and the date information of the user terminal device 100. If the date information included in the waiting number is earlier than the date of the user terminal 100, the processor 140 may delete the waiting number.

The operation of removing the waiting number may be performed by at least one of various devices (user terminal device 100, application server 200, hospital management server 300, reception management server 500) which generate or receive the waiting number.

The smart treatment system according to the disclosure distinguishes identification information and symptom information of a patient. Specifically, the user terminal device 100 transmits the identification information to the application server 200, and the application server 200 transmits the identification information to the hospital management server 300. On the contrary, the user terminal device 100 does not transmit the symptom information to the application server 200 and directly transmits the symptom information to the hospital management server 300. Thus, even if the application server 200 is hacked, the patient symptom information may not be leaked. The patient's symptom information may be specified in conjunction with a waiting number. In general, since the symptom information is combined with the unique personal identification information of the patient, it may be seen that the symptom information is whose medical history information, but the symptom information is combined with the waiting number, to whom which the symptom information belongs may not be easily known. However, the doctor should identify to which patient the symptom information combined with the waiting number belongs. Accordingly, an operation of mapping waiting person information (including symptom information) and patient information (identification information) may be necessary. Through this process, the hospital management server 300 or the patient's doctor may know to which patient the symptom information belongs. The method for managing symptom information according to the disclosure may previously collect (or receive) symptom information of a patient without storing symptom information in the application server 200, thereby shortening the treatment time. As the problem of personal information leakage may be solved and the medial treatment time may be shortened, so the smart treatment system may effectively reduce the waiting time of the patient (customer).

The disclosure includes an operation of determining whether the reserved patients will actually visit the hospital. Specifically, the hospital management server 300 may receive location information from the user terminal device 100. If it is determined that the received location information is within a threshold distance from the location of the hospital, the hospital management server 300 may determine that the patient will actually visit the hospital. If the hospital visit of the reservation patient is determined by using the location information, the no-show customer may be distinguished and unnecessary reservation may be easily canceled. According to an embodiment of the disclosure, if an unnecessary reservation may be cancelled, the complexity of the hospital management may be removed and simplified, and waiting customers may be efficiently managed. If the waiting customers are efficiently managed, the smart treatment system according to the disclosure may shorten the hospital waiting time of patients.

Figure 2:
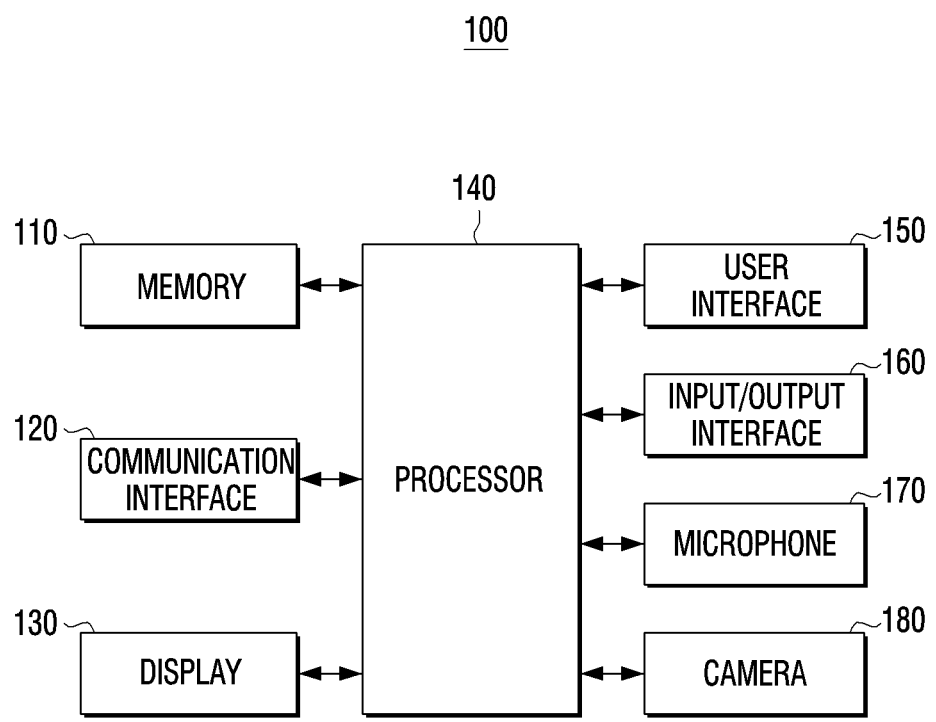
FIG. 2 is a block diagram illustrating a specific configuration of a user terminal device of FIG. 1.

FIG. 2 is a block diagram illustrating a specific configuration of a user terminal device of FIG. 1.

Referring to FIG. 2, the user terminal 100 may include at least one of the memory 110, the communication interface 120, the display 130, the processor 140, a user interface 150, an input/output interface 160, a microphone 170, or a camera 180.

The memory 110, the communication interface 120, the display 130, and the processor 140 have been described in FIG. 1 and a duplicate description will be omitted.

The user interface 150 may include various interface circuitry and be implemented with a device such as, for example, and without limitation, at least one of a button, a touch pad, a mouse, a keyboard, or a touch screen capable of performing the above-described display function and operation input function. The button may be various types of buttons such as at least one of a mechanical button, a touch pad, a wheel, or the like, formed in an arbitrary area such as at least one of a front portion, a side portion, a back portion, or the like, of the outer surface of the main body of the user terminal device 100.

The input and output interface 160 may include various input/output circuitry, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input and output interface 160 may input or output at least one of an audio signal and a video signal.

According to an embodiment, the input and output interface 160 may include a port for inputting or outputting an audio signal or a video signal separately, or may be implemented as one port that inputs or outputs all the audio signals or video signals.

The user terminal device 100 may further include a microphone 170. The microphone 170 may include an element to receive a user voice or other sound and convert to audio data.

The microphone 170 may receive the user voice in an active state. For example, the microphone 170 may be integrally formed as an integral unit on at least one of an upper side, a front side direction, a side direction, or the like of the user terminal device 100. The microphone 170 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The camera 180 is configured to generate a captured image by capturing a subject. The captured image may include both a moving image and a still image.

The camera 180 may obtain an image of at least one external device and may be implemented as a camera, a lens, an infrared sensor, or the like.

The user terminal device 100 may include a speaker (not shown). The speaker (not shown) may output various notification sounds or voice messages, in addition to various audio data processed by an input/output interface.

The user terminal device 100 may include a vibration unit (not shown). The vibration unit (not shown) may be a component that provides a vibration function under a threshold condition. The threshold condition may be at least one of a reservation confirmation notification, a reservation time notification, a waiting number confirmation notification, a treatment order notification, a prescription information reception notification, a payment request notification, or a payment confirmation notification. In addition, a vibration function of a vibration unit (not shown) may be provided in various situations.

Figure 3:
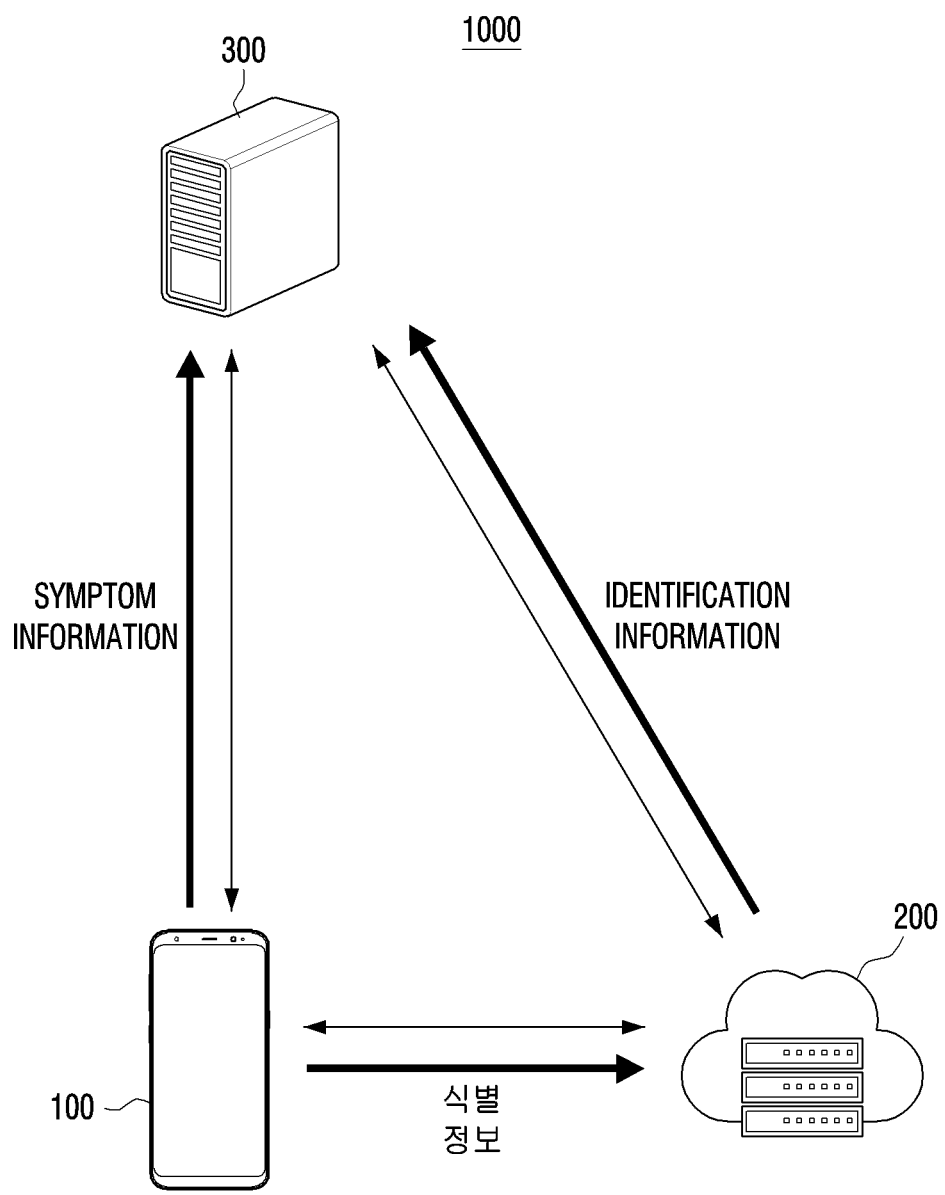
FIG. 3 is a diagram illustrating a configuration of a patient treatment system according to an embodiment of the disclosure.

FIG. 3 is a diagram illustrating a configuration of a patient treatment system according to an embodiment of the disclosure.

Referring to FIG. 3, the patient treatment system 1000 may include the user terminal device 100, the application server 200, and the hospital management server 300.

The patient treatment system 1000 may refer to a group of various operations performed in the hospital. To be specific, the patient treatment system 1000 may include operations related to reservation, reception, treatment, cure steps performed in the treatment process of the patient.

The user terminal device 100 may refer to a portable electronic device such as a smartphone, a tablet, and a personal digital assistant (PDA). An application may be installed in the user terminal device 100, and more specifically, a hospital application used for the patient treatment system 1000 may be installed in the user terminal device 100. The hospital application may provide various UIs to guide the user to perform a reservation of a desired hospital for treatment.

The application server 200 may refer to a server for managing and controlling an application installed in the user terminal device 100. The application server 200 may perform an execution environment of an application program installed in the user terminal device 100 and a connection function of the database. The application server 200 is operable to transmit and receive data to and from the user terminal device 100 with the external server or an external device through an application installed in the user terminal device 100.

The hospital management server 300 may refer to various electronic devices used in the hospital. The hospital management server 300 may mean various devices used in a hospital, such as a device for storing medical records of patients, a reception management device for managing a waiting number, etc., a device for inputting information related to a patient by a doctor, a device for controlling a plurality of devices in a hospital, and the like. The hospital management server 300 may refer to at least one electronic device. According to an embodiment, the hospital management server 300 may be configured as a plurality of hardware or configured as a plurality of electronic devices.

The user terminal device 100 may transmit symptom information (or personal symptom information) and identification information (or personal identification information) to different devices. Here, the symptom information may refer to a symptom that a user feels physical abnormality. The identification information may refer to information that may identify a user, such as a name, a birth date, a resident number, a passport number, a medical insurance number, unique identification (ID), etc.

The user terminal device 100 may transmit the identification information to the application server 200 in the reservation step. The application server 200 may transmit the received identification information to the hospital management server 300. The hospital management server 300 may perform a reservation operation based on the received identification information.

The user terminal device 100 may directly transmit symptom information to the hospital management server 300 without passing through the application server 200. In the patient treatment system 1000, the symptom information and the identification information may be transmitted to the hospital management server 300.

The reason why the user terminal device 100 transmits the symptom information and the identification information to different devices may be to protect personal information. When the symptom information and the identification information are grouped into one data group and transmitted, the possibility leakage of personal information may be high. However, when the symptom information and the identification information are distinguished and transmitted as shown in FIG. 3, the symptom information may not be leaked even if the application server 200 is hacked. Similarly, the identification information of the user may not be leaked even when hacking is performed in the process of symptom information transmission from the user terminal device 100.

Figure 4:
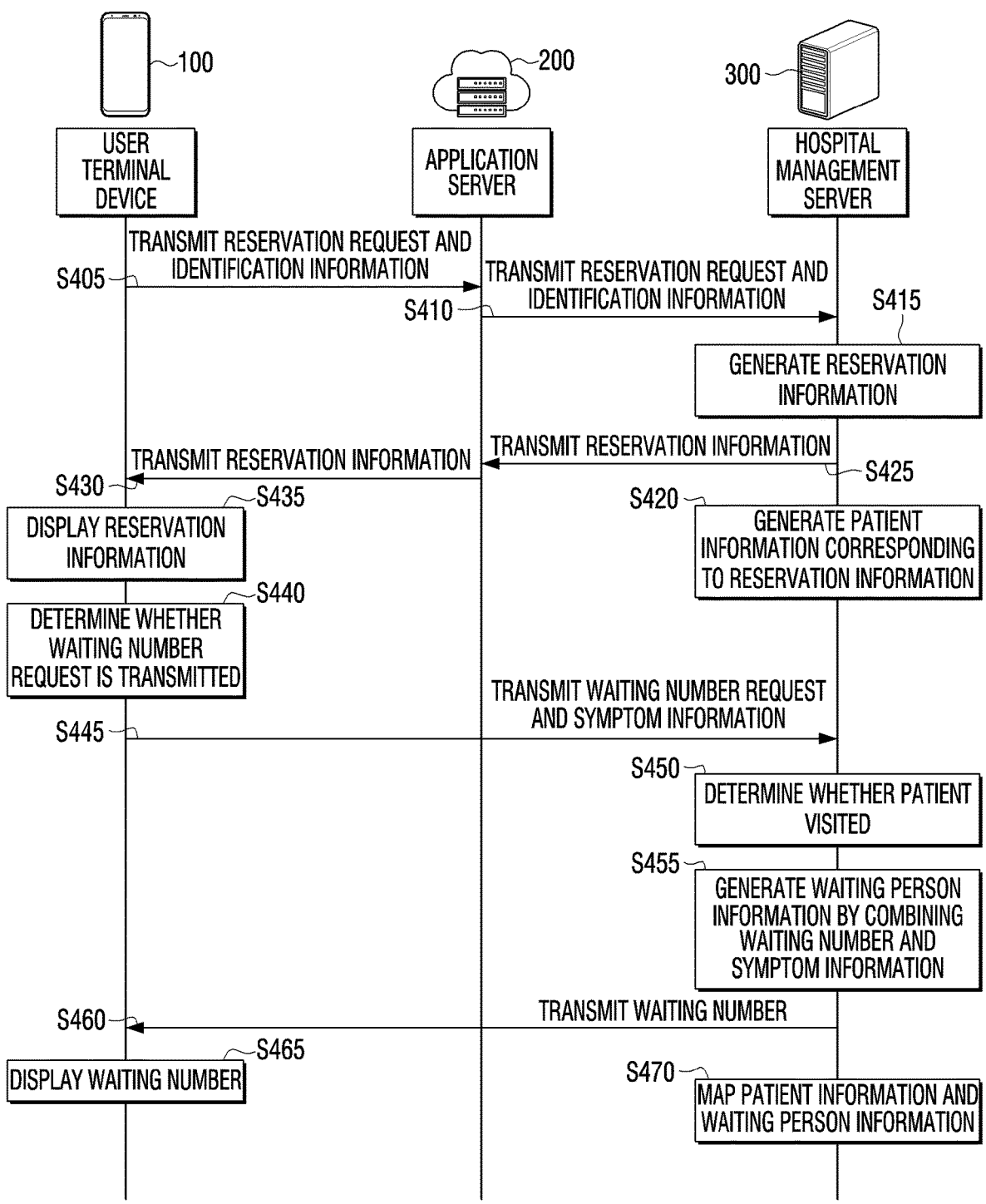
FIG. 4 is a flowchart illustrating the embodiment of FIG. 3.

FIG. 4 is a flowchart illustrating the embodiment of FIG. 3.

Referring to FIG. 4, the user terminal 100 may transmit the reservation request and the identification information to the application server 200 based on the user input in operation S405. The application server 200 may transmit the received reservation request and identification information to the hospital management server 300 in operation S410. The hospital management server 300 may generate reservation information based on the received reservation request and the identification information in operation S415. Here, the reservation information may include various information related to treatment of the hospital, such as a hospital name, a department, a reservation time, a doctor in charge of reservation, a preparation, an attention, and the like. In generating the reservation information, the hospital management server 300 may identify whether a patient is a new patient or a returning patient. The hospital management server 300 may manage the reservation information differently depending on whether the patient is a new patient. Specifically, when the patient is a new patient, the hospital management server 300 may newly generate information about the patient in the EMR server 400 (see FIG. 6).

The hospital management server 300 may generate patient information corresponding to the reservation information based on the received reservation information in operation S420. For example, if the user name included in the received reservation information is "Hong, Kil-dong," it is possible to generate patient information for "Hong, Kil-dong" stored in the hospital database. Here, the patient information may refer to information on a medical record in which both personal identification information and medical history information are recorded. In the case of a new patient, the hospital management server 300 may generate a new sick record number because the patient information is not stored in the database. In the case of returning patient, the patient information is stored in the database, it is possible to add the reservation information to the existing sick record number. The detailed operation related to the reservation request will be described later with reference to FIGS. 10 to 14. Meanwhile, the hospital management server 300 or the application server 200 may automatically delete the reservation information or the identification information related to the personal information of the patient when the predetermined time elapses. The deletion operation associated with the prescription information will be described in detail in FIG. 28.

The hospital management server 300 may transmit the generated reservation information to the application server 200 in operation S425. The application server 200 may transmit the received reservation information to the user terminal device 100 in operation S430. The user terminal device 100 may display the received reservation information on the display in operation S435. The user terminal device 100 may determine whether a waiting number request is requested in operation S440. The operation of determining whether a waiting number is requested may refer to determining whether to transmit a request to assign a user-specific waiting number to the hospital management server 300. The reason why the waiting number is newly requested differently from the reservation may be because the hospital determines the treatment order of the patients using the waiting number separately from the reservation information. Accordingly, the user terminal device 100 may provide a UI asking a user's intention to determine whether a user visits the hospital. If the user terminal device 100 receives the user's response to visit the hospital (determines to request the waiting number), the user terminal device 100 may transmit the waiting number request and the symptom information to the hospital management server 300 in operation S445. When the user terminal device 100 transmits the symptom information together with the waiting number request, the user terminal device 100 is to separately transmit the symptom information, which is personal information, with the identification information. The symptom information may be stored in a memory of the user terminal device 100 or may be inputted by a user. The time point for receiving the symptom information may vary.

The hospital management server 300, upon receiving the waiting number request and symptom information from the user terminal device 100, may obtain device information for the user terminal device 100 transmitting the waiting number request and the symptom information.

The hospital management server 300 may determine whether the user visits the hospital in operation S450. A specific detail of S450 will be described with reference to FIGS. 15 to 17.

The hospital management server 300 determines that the patient visits a hospital, the hospital management server 300 may assign a waiting number having a priority to the user terminal device 100 based on the reservation information. The hospital management server 300 may combine the waiting number assigned to the user terminal device 100 and the symptom information received from the user terminal device 100 to generate waiting person information in operation S455. The waiting person information may include waiting number and symptom information and may not include identification information of the user. Therefore, with only the waiting person information, who is a user may not be specified.

The hospital management server 300 may transmit the waiting number assigned to the user terminal device 100 to the user terminal device 100 based on obtained device information in operation S460. The user terminal device 100 may display the received waiting number on the display in operation S465.

The hospital management sever 300 may map the patient information and waiting person information in operation S470. The step S470 will be described in detail with reference to FIGS. 20 to 26.

Figure 5:
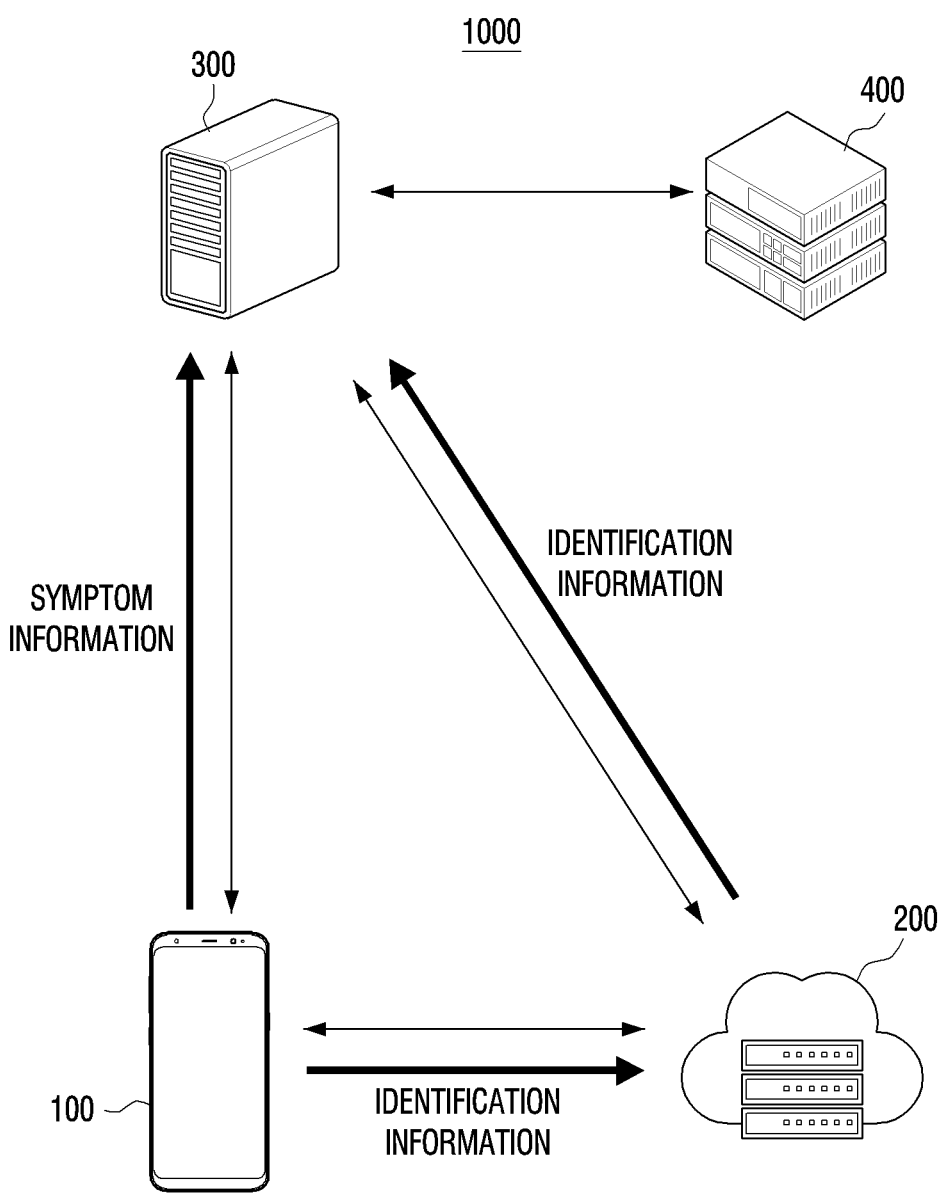
FIG. 5 is a diagram illustrating a configuration of a patient treatment system according to another embodiment of the disclosure.

FIG. 5 is a diagram illustrating a configuration of a patient treatment system according to another embodiment of the disclosure.

Referring to FIG. 5, the patient treatment system 1000 may include the user terminal device 100, the application server 200, the hospital management server 300, and the EMR server 400. In the description of FIG. 3, the hospital management server 300 includes various electronic devices used in the hospital. However, an embodiment in which the EMR server 400 that may be included in the hospital management server 300 of FIG. 3 is separated will be described with reference to FIG. 5.

Specifically, the user terminal device 100 may transmit the identification information to the application server 200, and the application server 200 may transmit the received identification information to the hospital management server 300, and the hospital management server 300 may transmit the received identification information to the EMR server 400. The EMR server 400 may search patient information corresponding to the received identification information and transmit the searched patient information to the hospital management server 300. The user terminal device 100 may transmit the symptom information to the hospital management server 300.

The EMR server 400 may refer to a server that computes medical records for a plurality of patients. Specifically, the EMR server 400 may retrieve patient information corresponding to the received identification information and transmit the retrieved patient information (including identification information) to the hospital management server 300.

In FIG. 3, the hospital management server 300 is described as a variety of electronic devices used in hospital management tasks, but the hospital management server 300 of FIG. 5 may mean a device for assigning a waiting number. In addition, the hospital management server 300 of FIG. 5 may mean a device for mapping patient information and waiting person information.

The hospital management server 300 may receive the symptom information from the user terminal device 100 and may receive identification information from the application server 200.

A specific description about the operations of FIG. 5 may correspond to the operations of FIG. 3. Therefore, a duplicate description with FIG. 3 will be omitted.

Figure 6:
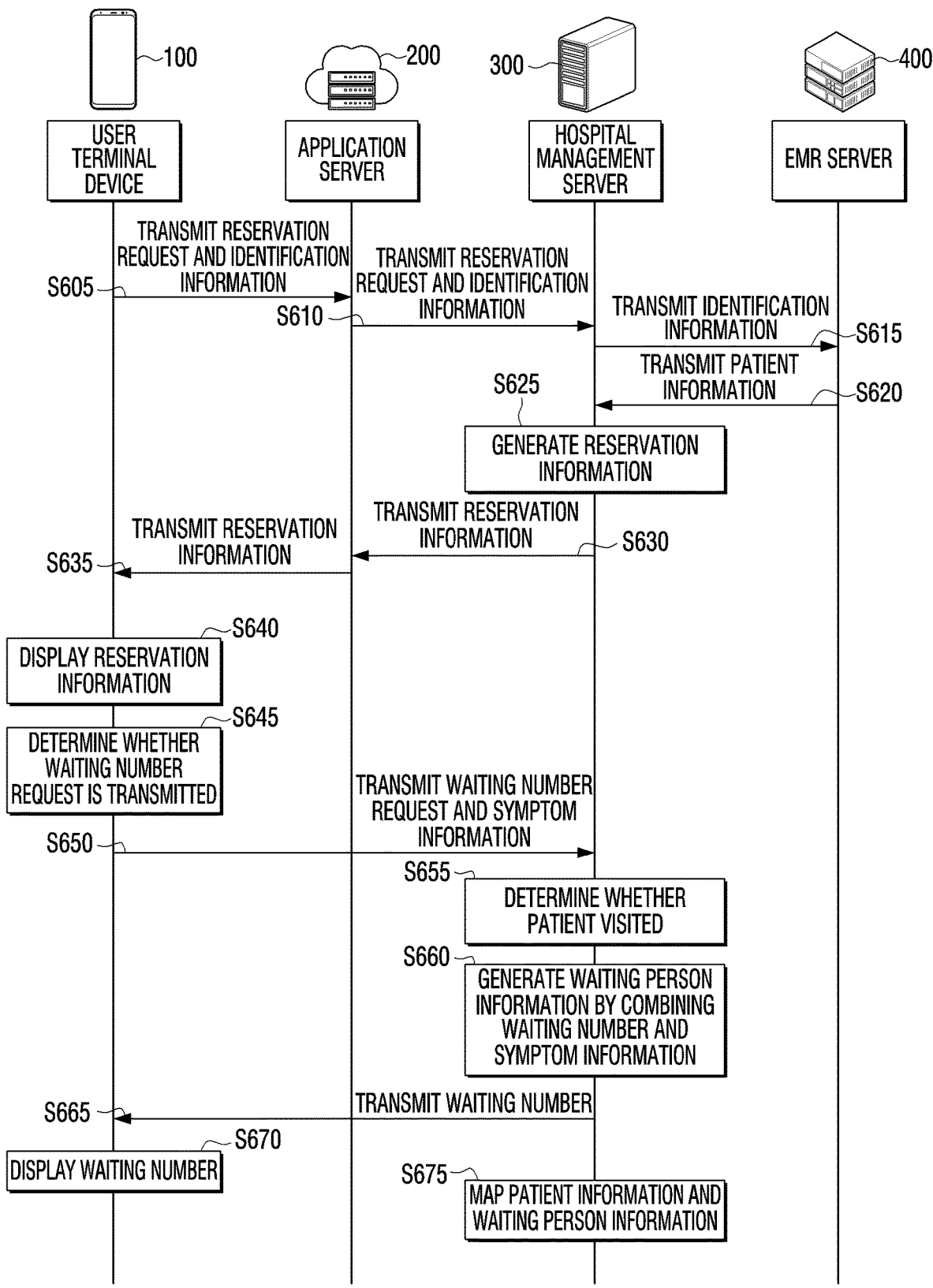
FIG. 6 is a flowchart illustrating the embodiment of FIG. 5.

FIG. 6 is a flowchart illustrating the embodiment of FIG. 5.

Referring to FIG. 6, the user terminal device 100 may transmit the reservation request and identification information to the application server 200 in operation S605. The application server 200 may then transmit the received reservation request and identification information to the hospital management server 300 in operation S610. The hospital management server 300 may transmit the received identification information to the EMR server 400 in operation S615. The EMR server 400 may then search patient information corresponding to the received identification information. The EMR server 400 may transmit the retrieved patient information to the hospital management server 300 in operation S620. If there is no patient information corresponding to the identification information received in the EMR server 400, the EMR server 400 may generate a new sick record number and may transmit the newly generated sick record number to the hospital management server 300. The hospital management server 300 may generate reservation information based on the received patient information in operation S625. The hospital management sever 300 may transmit the generated reservation information to the application server 200 in operation S630, and the application server 200 may transmit the received reservation information to the user terminal device 100 in operation S635.

If the user terminal device 100 receives reservation information, the user terminal device 100 may display reservation information in operation S640, and may determine whether to request the waiting number in operation S645. If it is determined that the user terminal device 100 requests the waiting number, the user terminal device 100 may transmit the waiting number request and symptom information to the hospital management server 300 in operation S650. The hospital management server 300 may determine whether the patient visits the hospital in operation S655. When it is determined that the user visits the hospital, the hospital management server 300 may allocate the waiting number to the user terminal device 100 and may combine the allocated waiting number and symptom information to generate the waiting person information in operation S660. The hospital management server 300 may transmit a waiting number to the user terminal device 100 in operation S665 and the user terminal device 100 may display the received waiting number on the display in operation S670. The hospital management server 300 may map the patient information and the waiting person information in operation S675.

A specific description of the operations illustrated in FIG. 6 may correspond to the operations of FIG. 4. Thus, a detailed description will be omitted for the description duplicate with FIG. 4.

FIG. 7 is a diagram illustrating a patient treatment system according to still another embodiment of the disclosure.

Referring to FIG. 7, the patient treatment system 1000 may include the user terminal device 100, the application server 200, the hospital management server 300, the EMR server 400, and the reception management server 500.

The reception management server 500 may refer to a device that performs a function related to a patient reception operation of a hospital. The reception management server 500 may refer to a device that separately performs a function of managing a waiting number. Although the hospital management server 300 of FIG. 5 has been described as performing the function of allocating the waiting number, the hospital management server 300 of FIG. 7 may not perform the function of allocating the waiting number, and may perform the function of mapping the patient information and the waiting person information.

The user terminal device 100 may transmit the identification information to the application server 200, and the application server 200 may transmit the received identification information to the hospital management server 300. The hospital management server 300 may transmit the received identification information to the EMR server 400. The EMR server 400 may search patient information corresponding to the received identification information and transmit the searched patient information to the hospital management server 300.

The user terminal device 100 may transmit the symptom information to the reception management server 500, and the reception management server 500 may transmit the received symptom information to the hospital management server 300 along with the waiting number.

The hospital management server 300 may receive the symptom information from the reception management server 500 and may receive the identification information from the application server 200.

A specific description of the operations of FIG. 7 may correspond to the operations of FIGS. 3 and 5. A duplicate description with FIGS. 3 and 5 is omitted.

Figure 8:
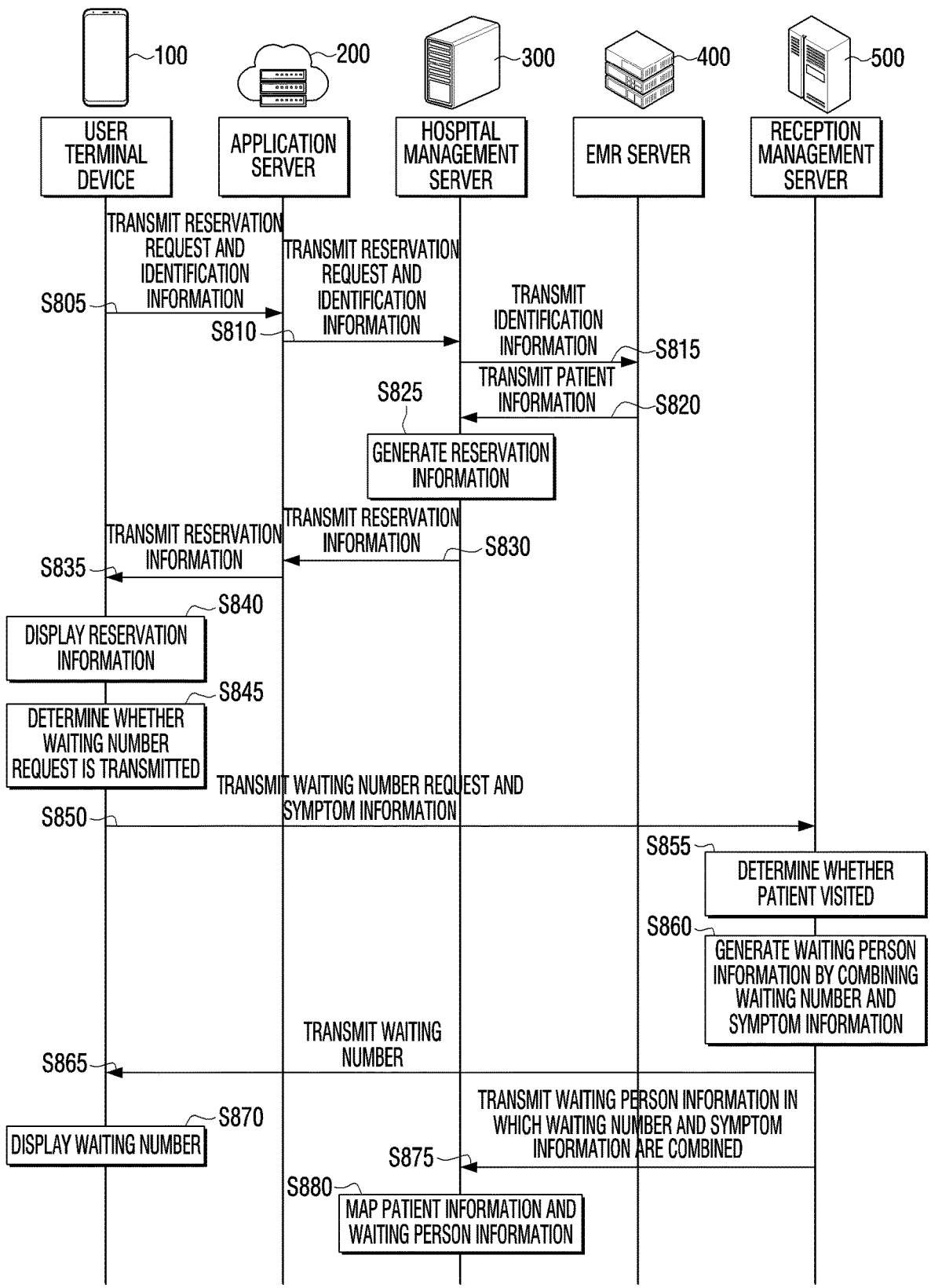
FIG. 8 is a flowchart illustrating the embodiment of FIG. 7.

FIG. 8 is a flowchart illustrating the embodiment of FIG. 7.

Referring to FIG. 8, the operations of S805, S810, S815, S820, S825, S830, S835, S840, and S845 may correspond to S605, S610, S615, S620, S625, S630, S635, S640, and S645 of FIG. 6. Therefore, a duplicate description with FIG. 6 will be omitted.

If it is determined that the user terminal device 100 of FIG. 8 requests the waiting number, the user terminal device 100 of FIG. 8 may transmit the waiting number request and the symptom information to the reception management server 500 in operation S850. The reception management server 500 may determine whether the user visits the hospital in operation S855. If it is determined that the user visits the hospital, the reception management server 500 allocates the waiting number to the user terminal device 100 and combines the assigned waiting number and the symptom information to generate the waiting person information in operation S860. The reception management server 500 may transmit the waiting number to the user terminal device 100 in operation S865. The user terminal device 100 may display the received waiting number on the display in operation S870.

The reception management server 500 may transmit the waiting person information combined through S860 to the hospital management server 300 in operation S875. The hospital management server 300 may map the patient information and the waiting person information in operation S880.

A specific description of operations illustrated in FIG. 8 may correspond to the operations of FIGS. 4 and 6. A detailed description of the duplicate description with FIGS. 4 and 6 will be omitted.

Figure 9:
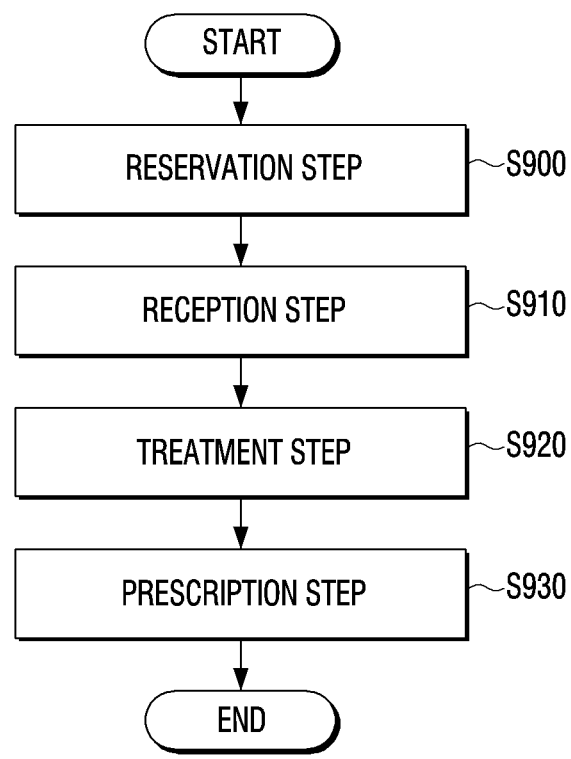
FIG. 9 is a flowchart illustrating a plurality of steps of managing a patient in a hospital.

FIG. 9 is a flowchart illustrating a plurality of steps of managing a patient in a hospital.

Referring to FIG. 9, the patient treatment system 1000 may include the reservation step S900, reception step S910, treatment step S920, and prescription step S930.

The reservation step S900 may mean a step of determining a reservation target and a reservation time before a patient directly visits a hospital. The reservation target may include at least one of a medical hospital, a medical department, or a medical doctor, and the reservation time may include at least one of a treatment time or an inspection time.

The reservation step S900 may include various embodiments of determining a reservation target and a reservation time. According to an embodiment, a user may directly determine a reservation target and a reservation time. According to another embodiment, if a medical symptom is input, at least one of a medical department, a medical hospital, a treatment time, or an inspection time may be determined.

The reception step S910 may mean a step of determining a treatment order when a patient actually visits a hospital. In reception step S910, a treatment order may be determined by distinguishing a case where the patient is reserved and a case where the patient is not reserved. If the patient is not reserved, the waiting number may be given to the user only if there is a separate waiting number request. Here, a separate waiting number request may be implemented in a form of requesting a waiting number by using a hospital application or may be implemented in a form of requesting orally to a receptionist.

The reception step may be implemented by pulling out a paper waiting number. A device providing the paper waiting number may be in a state in which the hospital management server 300 or the reception management server 500 and the time information are synchronized.

A treatment step S920 may refer to a step of examining a patient by a doctor. The electronic device used by a doctor may receive patient information from the internal database and may receive the waiting person information from a separate server other than the internal database. The patient information may include identification information corresponding to the user, and the waiting person information may include symptom information corresponding to the user. The patient information and the waiting person information may be mapped according to various embodiments. According to one embodiment, the patient information and the waiting person information may be automatically mapped based on the waiting number. According to another embodiment, patient information and waiting person information may be mapped based on an input of a doctor.

The prescription step in operation S930 may mean that the doctor issues a prescription corresponding to the patient based on the patient information and the waiting person information. Specifically, the doctor may input prescription information to the hospital management server 300. Some of the prescription information may be transmitted to the patient.

Figure 10:
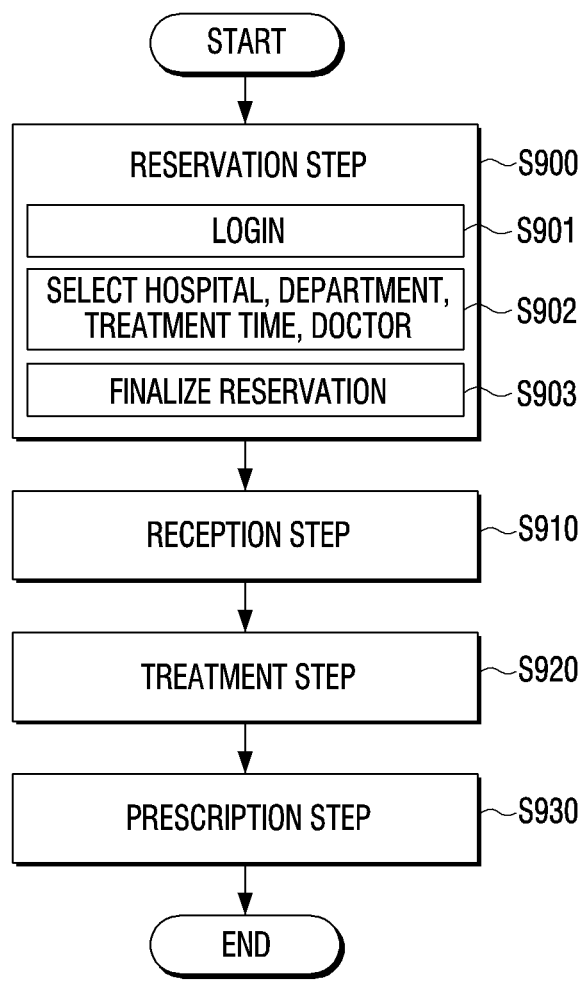
FIG. 10 is a flowchart illustrating a reservation step according to an embodiment of a plurality of steps of managing a patient.

FIG. 10 is a flowchart illustrating a reservation step according to an embodiment of a plurality of steps of managing a patient.

Referring to FIG. 10, the reservation step S900 may include application log-in step S901, selecting the hospital, department, treatment time, or doctor in operation S902, and finalizing reservation in operation S903.

An application login step in operation S901 may mean that an application associated with a hospital obtains an access authority using the user's own ID. Here, the login method may be applied with various personal authentication methods such as a method of using a pre-stored unique ID and password, a mobile phone user authentication method, a biometric information authentication method, and the like.

The selecting at least one of the medical hospital, department, medial time, or doctor in operation S902 may be applied with various embodiments.

According to an embodiment, a user may search for at least one of a medical hospital, a medical department, a treatment time, or a doctor. The user may directly input at least one of medical hospital, a medical department, a treatment time, or a doctor, and the user terminal device 100 may obtain the inputted information as information necessary for reservation.

According to another embodiment, the user terminal device 100 may provide a user with a plurality of selection item UIs and may guide so that a user selects a specific item UI among a plurality of selection item UIs.

The user terminal device 100 may provide a plurality of selection item UI for a medical department. When the user inputs a medical symptom, the user terminal device 100 may analyze the department for the symptom. The user terminal device 100 may provide at least one medical department to the item UI based on the analyzed result. The user terminal device 100 may confirm whether the provided item UI matches the intention of the user.

The user terminal device 100 may provide a plurality of selection item UI for a medical hospital. The user terminal device 100 may provide a plurality of selection item UI for a medical hospital based on at least one of GPS location information of the user terminal device 100, pre-stored GPS location information (e.g., home, company), recent hospital visit history information.

The user terminal device 100 may provide a plurality of selection item UI for the treatment time. The user terminal device 100 may request available reservation time information by exchanging information with the hospital management server 300, and may obtain available reservation time information from the hospital management server 300. The user terminal device 100 may provide the plurality of selection item UI for the information about time that may be reserved.

When a user input for a specific item UI, among a plurality of provided item UIs, is received, the user terminal device 100 may obtain the information corresponding to the received specific item as information required for reservation.

The user terminal device 100 may display a plurality of lists on the basis of the user's past hospital visit history information, and obtain items selected by the user from among the plurality of lists as information required for reservation. An embodiment of using past hospital visit history information of a user is described in detail in FIGS. 11 and 12.

Finalizing reservation in operation S903 may mean transmitting the information necessary for reservation by the user terminal device 100 to the management server 300, and obtaining final reservation information by the user terminal device 100 from the hospital management server 300.

FIG. 11 is a diagram illustrating an embodiment of performing a reservation step using past history information.

Referring to FIG. 11, table 1105 may mean the user's past hospital visit history information. Table 1110 may refer to the result of analyzing table 1105. The user terminal device 100 may identify at least one of the latest visited hospital, the most-visited hospital, or the past visit hospital based on the user's past hospital visit history information. The past visit hospital may mean a hospital to recommend to the user based on other information other than the latest visited hospital. For example, the most-visited hospital may refer to the most visited hospital at a particular threshold period (e.g., 5 months) stored in the data, and the past visit hospital may mean a hospital that is most visited in all the periods stored in the data.

The user terminal device 100 may identify a latest visit date based on the date information of the past hospital visit history information and identify a hospital corresponding to the identified latest visit date and determine the hospital as a latest visit hospital. The user terminal device 100 may analyze past hospital visit history information of a threshold period (e.g., five months) to obtain the most-visited hospital.

The user terminal device 100 may provide at least one of the latest visit hospital, most-visited hospital, or past visit hospital as one item UI.

In the table 1105 and the table 1110, date, hospital, department, name of illness, or the like, but this is merely exemplary and additional information may be included.

Figure 12:
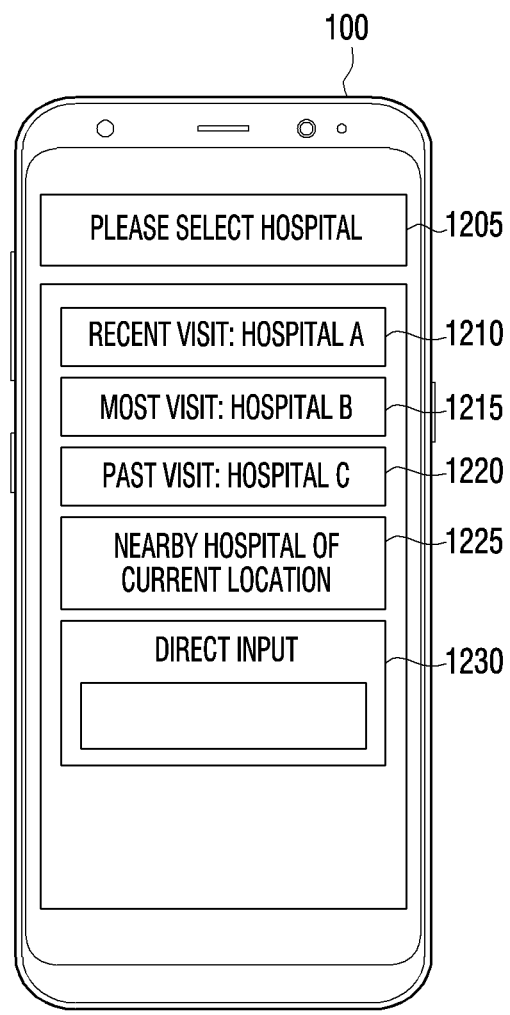
FIG. 12 is a diagram illustrating a user interface (UI) according to the embodiment of FIG. 11.

FIG. 12 is a diagram illustrating a user interface (UI) according to the embodiment of FIG. 11.

Referring to FIG. 12, the user terminal device 100 may provide a UI that guides the user to input hospital information to be visited in operation 1205. The user terminal device 100 may display a plurality of item UI to guide the user to select a specific item. The plurality of item UIs may include at least one of a UI 1210 corresponding to a recent visit hospital, a UI 1215 corresponding to the most visit hospital, a UI 1220 corresponding to a past visit hospital, a UI 1225 corresponding to a hospital around current location, and a UI 1230 for a user to directly input a visiting hospital.

The user terminal device 100 may transmit location information to the external server for UI corresponding to a hospital around the current location, and may receive hospital information corresponding to the location information from the external server.

Figure 13:
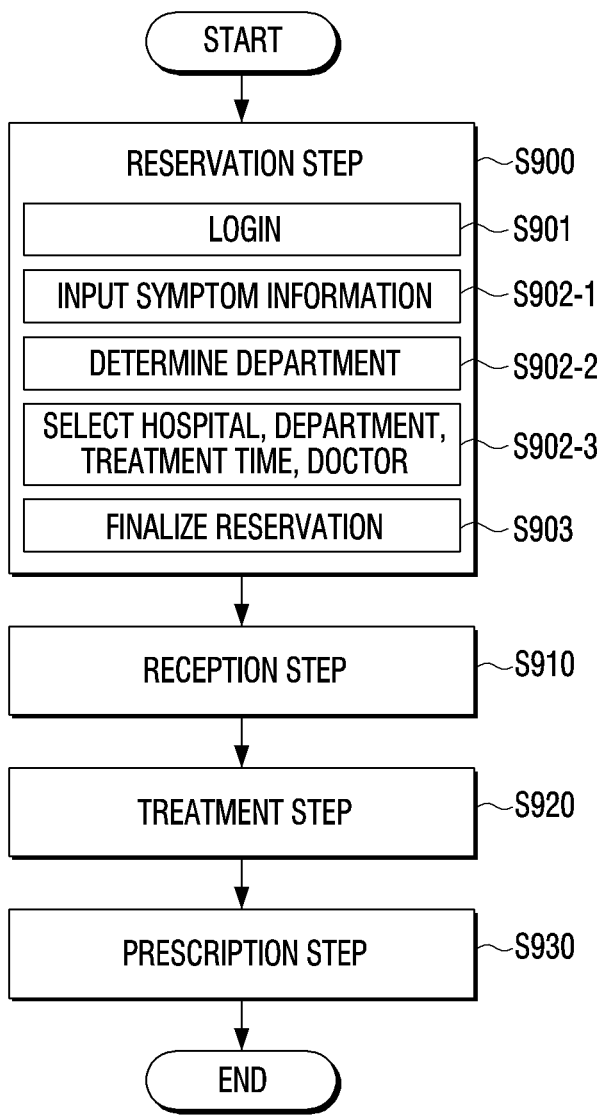
FIG. 13 is a flowchart illustrating a reservation step among a plurality of steps of managing a patient according to another embodiment.

FIG. 13 is a flowchart illustrating a reservation step among a plurality of steps of managing a patient according to another embodiment.

Referring to FIG. 13, the log-in step S901 and the reservation finalization step S903 among the reservation step S900 have been described with reference to FIG. 10, and thus a detailed description thereof will be omitted. The reservation step S900 may include receiving the symptom information of the user in operation S902-1, determining the department in operation S902-2, and selecting at least one of a medical hospital, a treatment time, or a doctor in operation S902-3.

The step S902-1 of receiving the symptom information of the user may refer to the step of receiving the symptom information input by the user. The user terminal device 100 may display a UI that guides a user to input symptom information. In addition, the user terminal device 100 may receive the symptom information input by the user through the user interface 150.

The determining the department in operation S902-2 may mean automatically identifying the department based on the received symptom information. The user terminal device 100 may determine a department corresponding to the received symptom information based on the pre-stored lookup table. The identified department may be at least one. If a plurality of departments are identified, the user terminal device 100 may preferentially display a result having a highest accuracy on the display.

For example, the pre-stored lookup table may be stored in the user terminal device 100. The user terminal device 100 may determine a department based on information stored in the internal memory.

As another example, the pre-stored lookup table may be stored in the application server 200. Accordingly, the user terminal device 100 may transmit the received symptom information to the application server 200, and the application server 200 may determine a department based on the received symptom information. Further, the determined department may be transmitted to the user terminal device 100. Here, the user terminal device 100 may not transmit the identification information in the process of transmitting the symptom information to the application server 200. When the symptom information is transmitted to the application server 200, there is possibility of leakage of personal information and when the symptom information is transmitted to the application server 200, the user terminal device 100 may transmit only the symptom information to the application server 200 except for the identification information.

The selection of at least one of a hospital, treatment time, or doctor in operation S902-3 may mean obtaining detailed information necessary for reservation after a department is decided.

Figure 14:
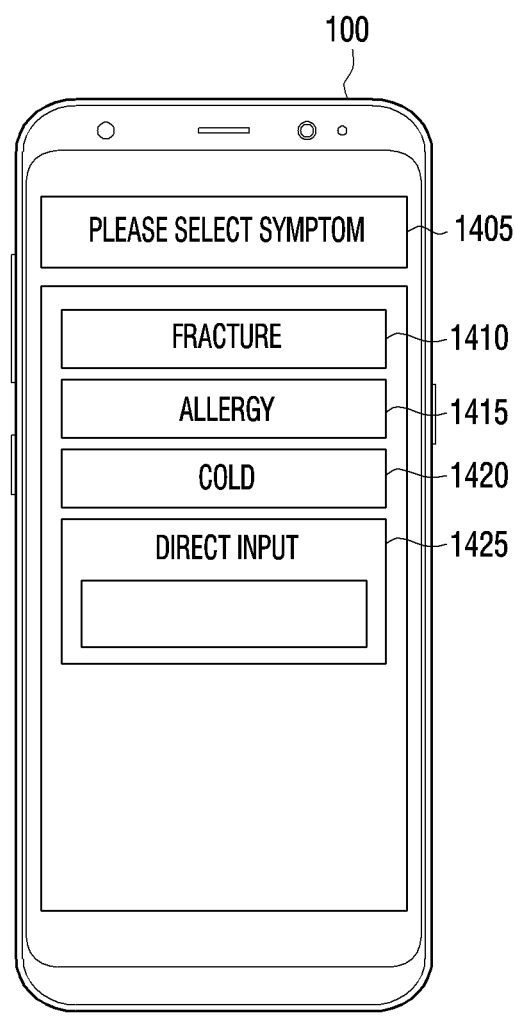
FIG. 14 is a diagram illustrating a UI according to the embodiment of FIG. 13.

FIG. 14 is a diagram illustrating a UI according to the embodiment of FIG. 13.

Referring to FIG. 14, the user terminal device 100 may display a UI 1405 for guiding the symptom information to be input on the display. The user terminal device 100 may display a plurality of item UIs on the display. Here, the plurality of item UIs may include at least one of a UI 1410 corresponding to the recently-diagnosed name of disease, a UI 1415 corresponding to the most diagnosed name of disease, a UI 1420 corresponding to a name of disease diagnosed in the past, or a UI 1425 for allowing a user to directly input the symptom.

Information (fracture, allergy, flu) displayed on the plurality of item UIs 1410, 1415, 1420 may be based on information included in the table 1105 of FIG. 11.

Figure 15:
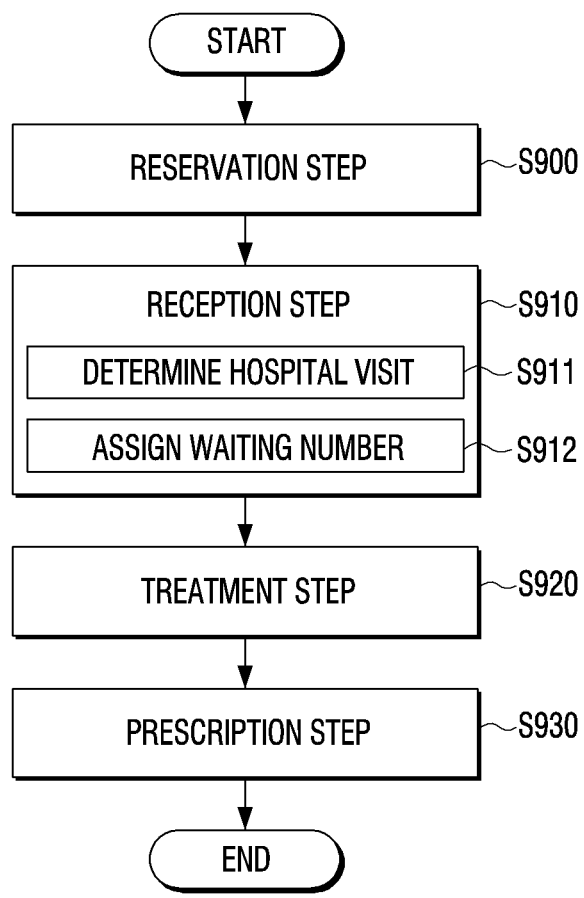
FIG. 15 is a flowchart illustrating a reception step among a plurality of steps of managing a patient.

FIG. 15 is a flowchart illustrating a reception step among a plurality of steps of managing a patient.

Referring to FIG. 15, the reception step in operation S910 may include determining visit to hospital in operation S911 and assigning a waiting number in operation S912.

The step S911 of determining visit to hospital may mean determining whether the user (or patient) requesting the waiting number has visited the hospital. If a waiting number is assigned remotely, a problem may arise that the user is not present near the hospital, and a meaningless waiting number is assigned. The hospital management server 300 may assign a waiting number to the patient only under certain conditions. Specific operations for determining whether the patient has visited the hospital are described below in FIGS. 16 and 17.

The step of assigning a waiting number in operation S912 may refer to a step of assigning a reception number. The hospital management server 300 may determine a treatment order based on the waiting number and the symptom information.

It is assumed that the treatment order of patients A, B, and C is determined. The information of a patient is as shown below.

"patient A: waiting number 1, VAS pain score 3 (less severe pain), date of sickness: before five months, time left from the estimated treatment time: 5 minutes"

"patient B: waiting number 2, VAS pain score 6 (medium level pain), date of sickness: before one week, time left from the estimated treatment time: 20 minutes"

"patient C: waiting number 3, VAS score 9 (severe pain), date of sickness: the very day, fall from height of 10 m, time left from the estimated treatment time: 40 minutes"

The hospital management server 300 may determine the treatment order based on the waiting number and symptom information.

According to an embodiment, the hospital management server 300 may determine a treatment order in consideration of a waiting number. Specifically, the hospital management server 300 may determine a treatment order in the order of waiting numbers 1, 2, and 3.

According to another embodiment, the hospital management server 300 may decide the treatment order in consideration of the symptom information (or pain information). In this case, the hospital management server 300 may determine the treatment order in an order of waiting numbers 3, 2, and 1.

In accordance with another embodiment, the hospital management server 300 may determine a treatment order in consideration of a patient requiring priority in determining a treatment order. In the above example, there may be a patient whose waiting number is 10. The patient D may be a patient requiring priority. For example, the patient D may be an emergency patient who needs urgent treatment, or a patient causing disturbance. The hospital management server 300 may prioritize the patient D regardless of the waiting number and determine a treatment order. The hospital management server 300 may determine a treatment order in the order of 10, 3, 2, and 1.

It is described that the hospital management server 300 performs the related operation in connection with the waiting number, the reception management server 500 may be implemented in the form of performing an associated operation. The reception management server 500 may additionally include a display, and the reception management server 500 may display the treatment order on the display. In addition, when a situation in which a priority should be given as a patient D is generated, a phrase asking understanding may be provided.

According to another embodiment, the assigning the waiting number in operation S912 may mean an operation of assigning a waiting number when it is determined that the patient visits a hospital. The waiting number may include at least one of target information, time information, order information, and emergency information. The target information may include information about at least one of a medical hospital, a department, and a doctor. The user may grasp the waiting order of which department and which doctor based on the target information. The time information may include at least one of a time at which the waiting number is assigned, and information about expected waiting time. The order information may mean information related to the current waiting order. The emergency information may refer to information indicating whether a current patient is a urgent patient. If it is determined that the patient with low priority is classified as an emergency patient, the patient may have treatment preferentially. The emergency information may be determined based on at least one of symptom information, a request of a patient, a request of a hospital staff.

Figure 16:
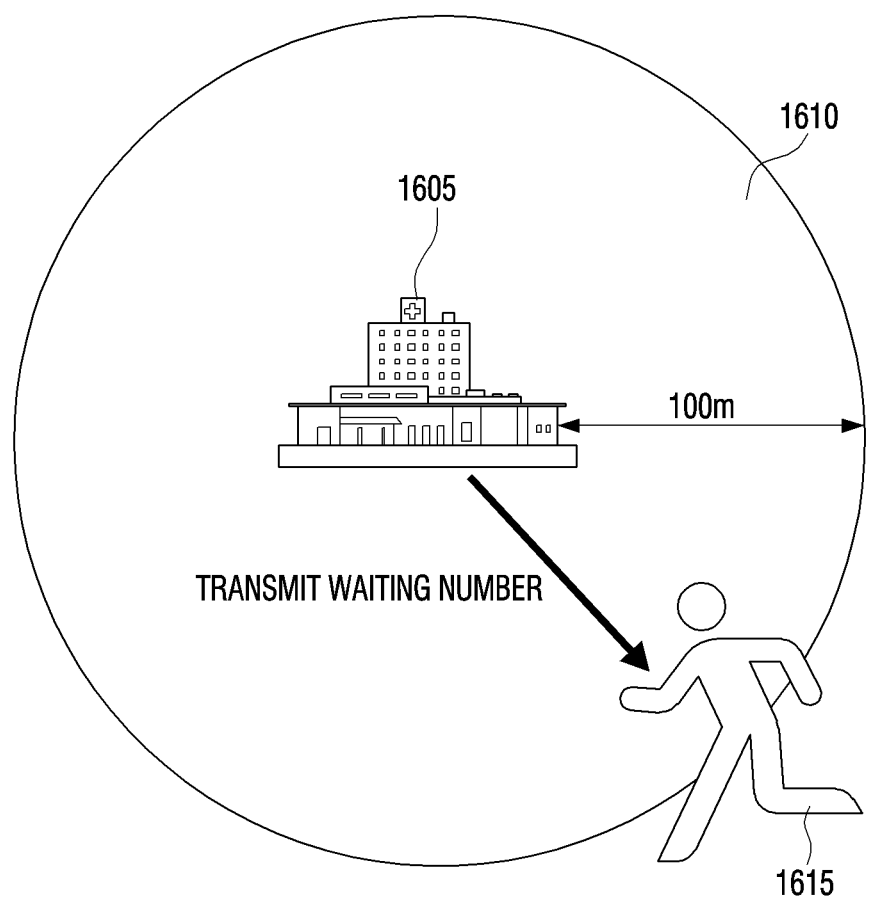
FIG. 16 is a diagram illustrating an embodiment of transmitting a waiting number using location information.

FIG. 16 is a diagram illustrating an embodiment of transmitting a waiting number using location information.

According to an embodiment, when a user confirms a hospital reservation, the user terminal device 100 may store reservation information in a memory. The user terminal device 100 may activate a global positioning system (GPS) function based on the reservation time included in the reservation information. The user terminal device 100 may transmit the location information to the hospital management server 300. The hospital management server 300 may determine whether the user is in the vicinity of the current hospital based on the location information.

According to another embodiment, if a user does not make a hospital reservation, the user terminal device 100 may transmit location information to the hospital management server 300 based on the waiting number request of the user. The hospital management server 300 may determine whether the use is current in the vicinity of a hospital when receiving location information from the user terminal device 100, if there is no reservation information.

If the hospital management server 300 of the specific hospital 1605 determines that the location information of the user 1615 is within the threshold distance 1610 (e.g., 100 m) at the hospital location, the hospital management server 300 may transmit the waiting number to the user terminal device 100. If the hospital management server 300 determines that the location information of the user 1615 is at least a threshold distance from the hospital location based on the location information, the hospital management server 300 may not assign a waiting number. Here, the hospital management server 300 may transmit, to the user terminal device 100, a signal to control to display a UI asking whether to cancel reservation to the user terminal device 100. The hospital management server 300 may cancel a reservation when there is no user's response or a reservation cancellation command is received.

Figure 17:
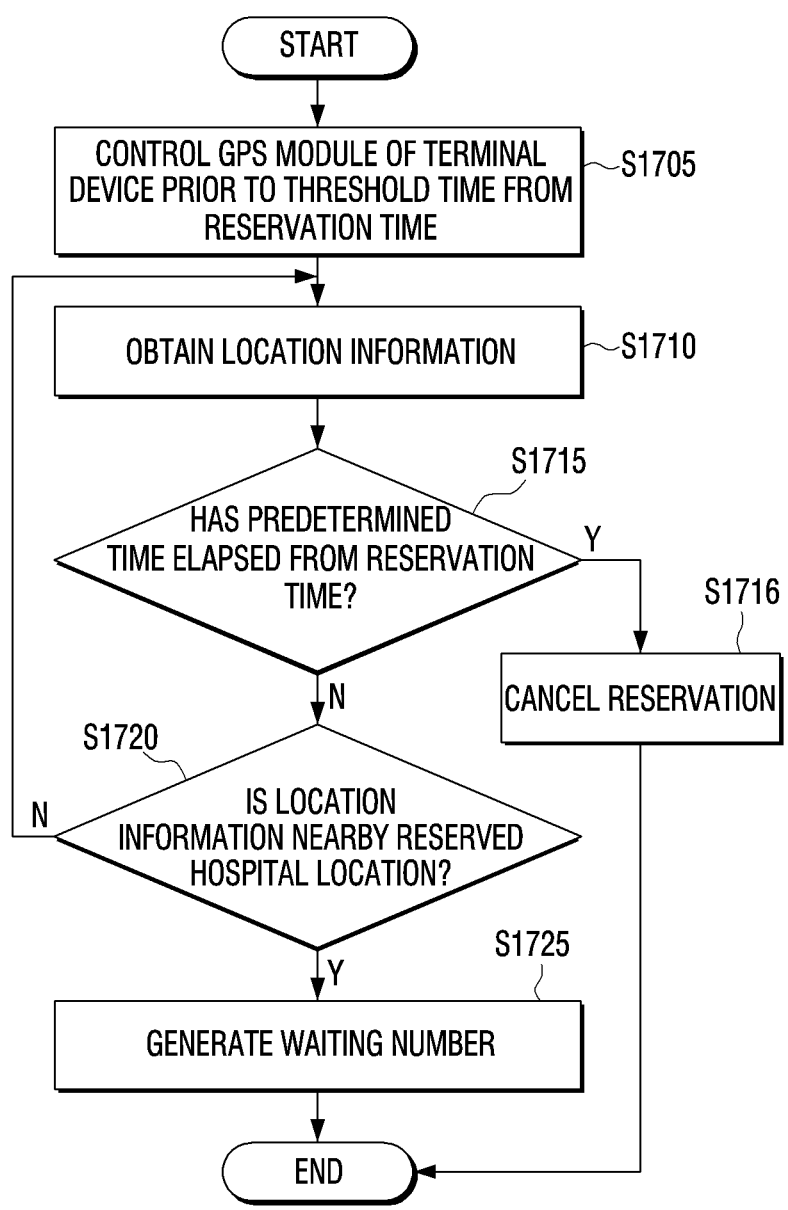
FIG. 17 is a flowchart illustrating a specific method of the embodiment of FIG. 16.

FIG. 17 is a flowchart illustrating a specific method of the embodiment of FIG. 16.

Referring to FIG. 17, it is assumed that a patient has finalized a hospital visit reservation. The hospital management server 300 may control the GPS module of the user terminal 100 before a threshold time of the reservation time in operation S1705. For example, if the reservation time is 2 p.m. and the threshold time is 15 minutes, the hospital management server 300 may control the GPS module of the user terminal device 100 from 1:45 p.m. Controlling the GPS module of the user terminal device 100 may mean that the hospital management server 300 transmits a control command requesting GPS information to the user terminal device 100. The user terminal device 100 may receive a control command requesting GPS information, obtain GPS information, and transmit the obtained GPS information to the hospital management server 300.

The hospital management server 300 may obtain location information from the user terminal device 100 in operation S1710.

The hospital management server 300 may determine whether the predetermined time has elapsed after the reservation time in operation S1715. For example, if the reservation time is 2 p.m. and the predetermined time is 20 minutes, the hospital management server 300 may determine whether 2:20 pm has elapsed. When the predetermined time elapses after the reservation time, the hospital management server 300 may cancel the reservation in operation S1716. If the predetermined time has not elapsed after the reservation time, the hospital management server 300 may determine whether the received location information of the user terminal device 100 is near the location of the reserved hospital in operation S1720.

If it is determined that the location information of the user terminal device 100 is not near the location of the reserved hospital, the hospital management server 300 may continue to receive location information from the user terminal device 100. If it is determined that the location information of the user terminal 100 is near the location of the reserved hospital, the hospital management server 300 may generate the waiting number in operation S1725.

When the waiting number is generated or the waiting number is cancelled, the user's confirmation may be necessary.

Figure 18:
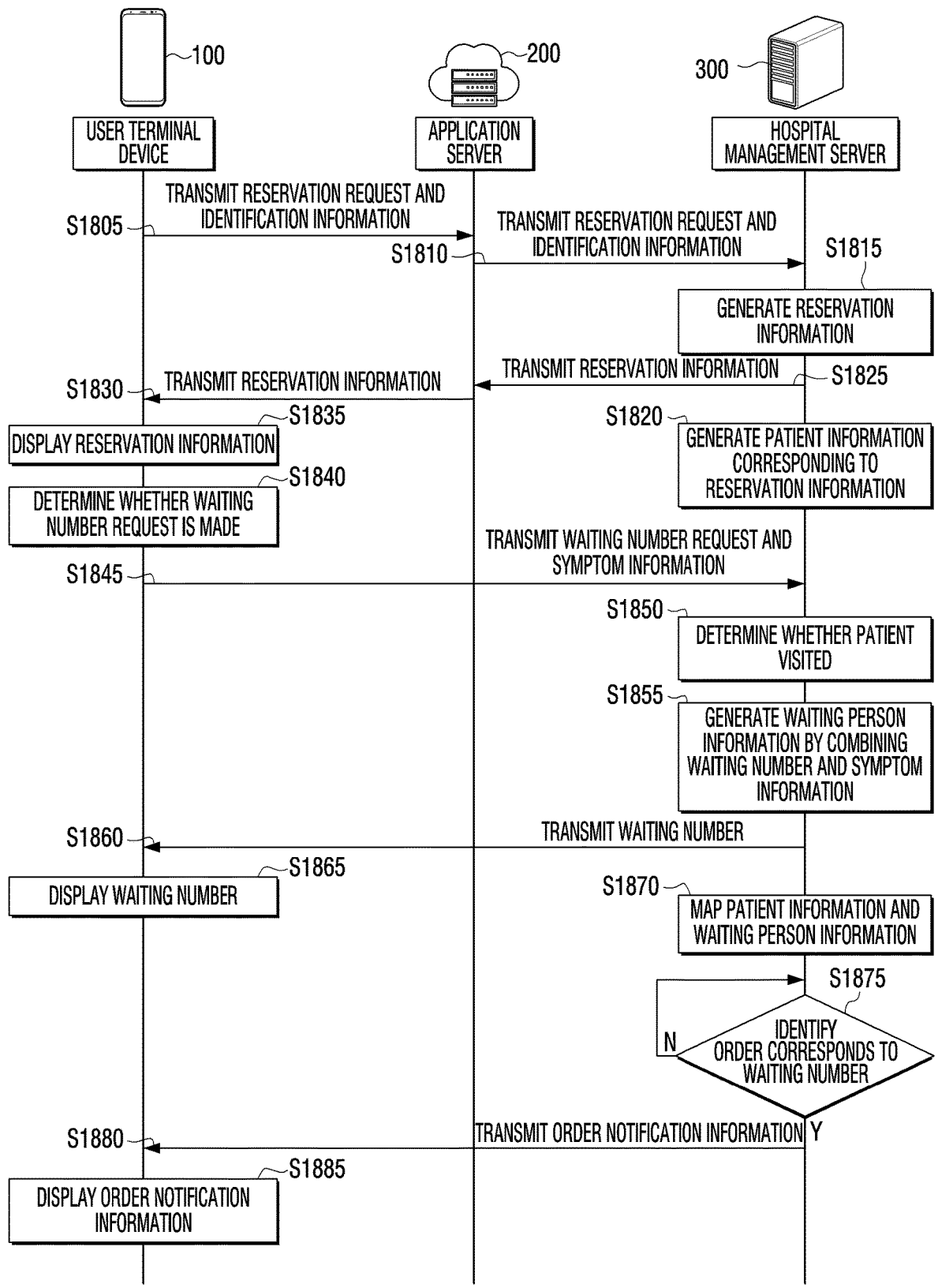
FIG. 18 is a flowchart illustrating an embodiment of transmitting order notification.

FIG. 18 is a flowchart illustrating an embodiment of transmitting order notification.

Referring to FIG. 18, S1805, S1810, S1815, S1820, S1825, S1830, S1835, S1840, S1845, S1850, S1855, S1860, S1865, and S1870 may correspond to S405, S410, S415, S420, S425, S430, S435, S440, S445, S450, S455, S460, S465, and S470 of FIG. 4. Accordingly, a duplicate description will be omitted.

The hospital management server 300 may determine whether the location information of the user terminal device 100 is near the hospital based on the S1850. If the location information of the user terminal device 100 is near a hospital, a waiting number may be assigned to the user terminal device 100. The hospital management server 300 may determine whether the current treatment order is the order of the waiting number allocated to the user terminal device 100 in operation S1875. If the current treatment order is not the order of the waiting number assigned to the user terminal device 100, the hospital management server 300 may monitor the treatment order until the order of the waiting number allocated to the user terminal device 100 comes.

The hospital management server 300 may receive (or synchronize) the latest sick record from the EMR server 400 if the location information of the user terminal device 100 is near the hospital, based on step S1850. The sick record number stored in the EMR server 400 may be highly reliable data. However, when attempting to synchronize a sick record number to the EMR server 400, the information of the patients who do not actually visit the hospital may be updated in the EMR server 400. In order to prevent unnecessary access to the EMR server 400 in this situation, the hospital management server 300 may receive the latest sick record number from the EMR server 400, only in a case where the location information of the user terminal device 100 is near the hospital.

The order of the waiting number allocated to the user terminal device 100 is nearer, the hospital management server 300 may provide the order notification information to the user terminal device 100 in operation S1880. The user terminal device 100 may display the received order notification information on the display in operation S1885.

Figure 19:
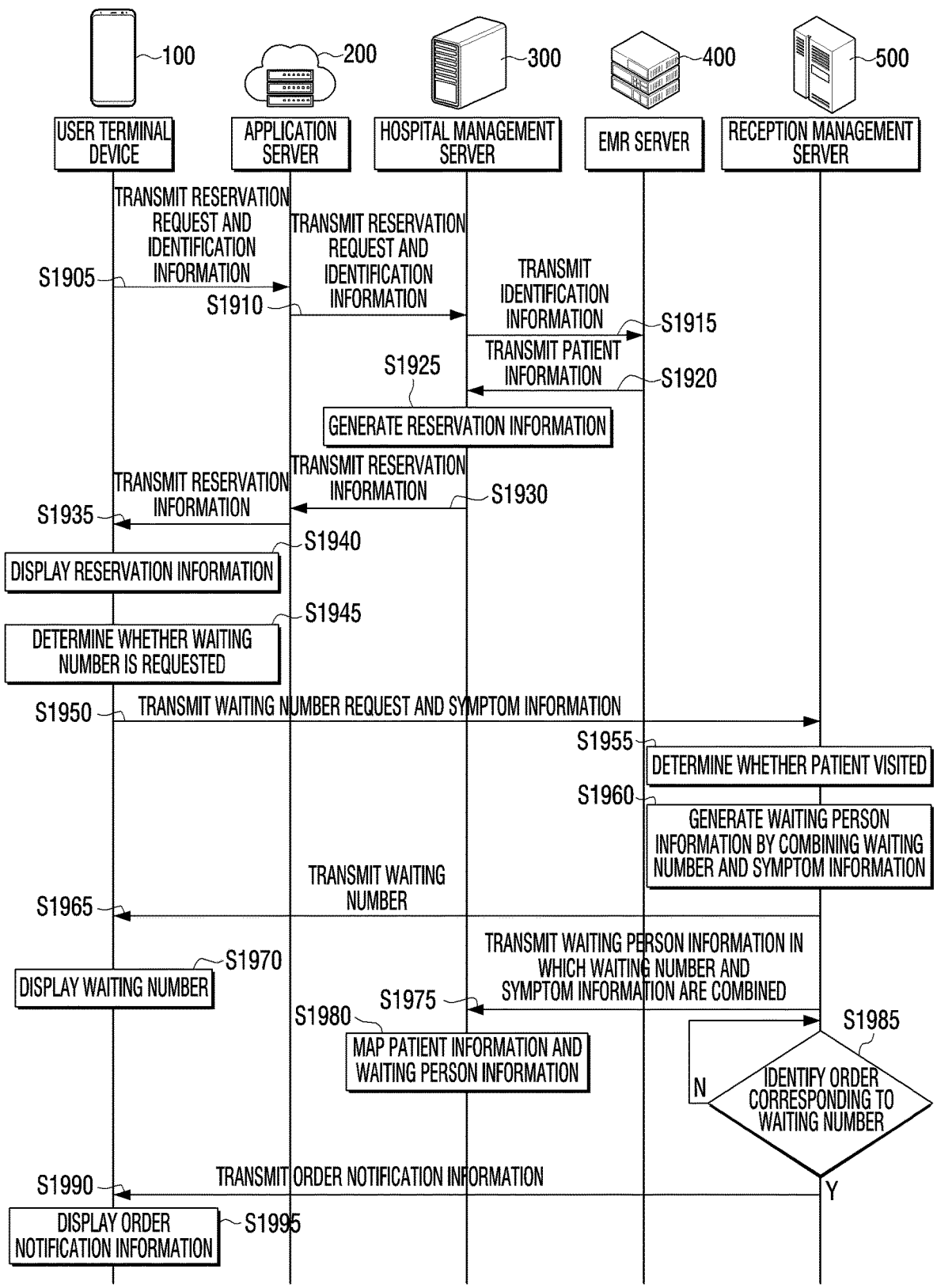
FIG. 19 is a flowchart illustrating another embodiment of transmitting order notification information.

FIG. 19 is a flowchart illustrating another embodiment of transmitting order notification information.

Referring to FIG. 19, S1905, S1910, S1915, S1920, S1925, S1930, S1935, S1940, S1945, S1950, S1955, S1960, S1965, S1975, and S1980 may correspond to S805, S810, S815, S820, S825, S830, S835, S840, S845, S850, S855, S860, S865, S875, and S880 of FIG. 8. Therefore, a duplicate description will be omitted.

The reception management server 500 may determine whether the location information of the user terminal device 100 is near the hospital based on S1955. If the location information of the user terminal device 100 is near a hospital, the user terminal device 100 may assign a waiting number to the user terminal device 100. The reception management server 500 may determine whether the current treatment order is the order of the waiting number allocated to the user terminal device 100 in operation S1985. If the current treatment order is not the order of the waiting number assigned to the user terminal device 100, the reception management server 500 may monitor the treatment order until the order of the waiting number allocated to the user terminal device 100 comes.

If the order of the waiting number allocated to the user terminal device 100 is nearer, the reception management server 500 may provide the order notification information to the user terminal device 100 in operation S1990. The user terminal device 100 may display the received order notification information on the display in operation S1995.

Figure 20:
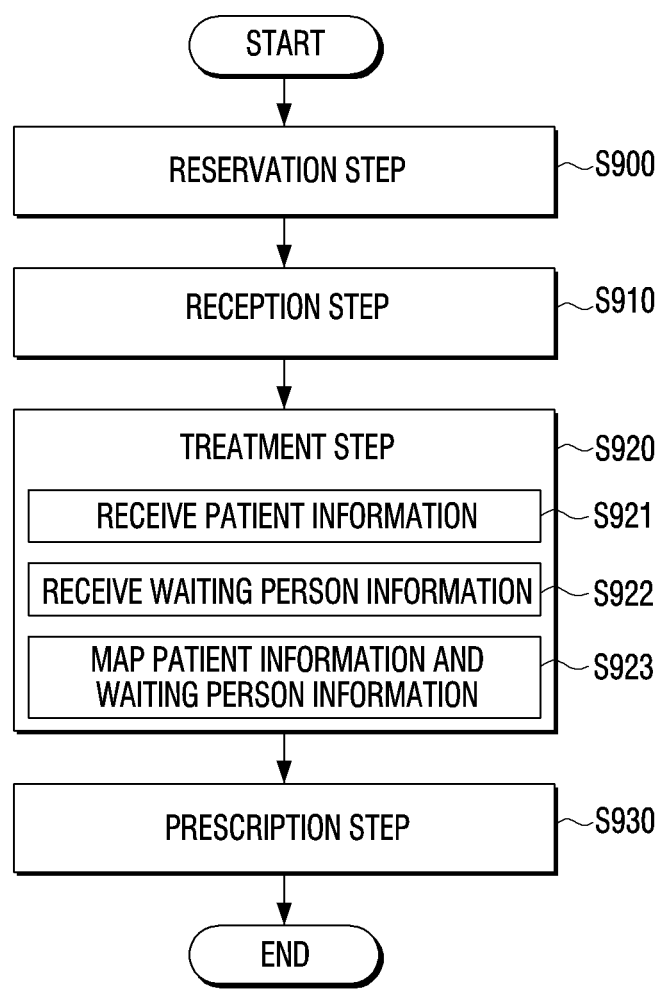
FIG. 20 is a flowchart illustrating the treatment step among a plurality of steps of managing a patient.

FIG. 20 is a flowchart illustrating the treatment step among a plurality of steps of managing a patient.

Referring to FIG. 20, the treatment step S920 may include receiving the patient information in operation S921, receiving the waiting person information in operation S922, and mapping the patient information and the waiting person information in operation S923.

The receiving the patient information in operation S921 may mean obtaining information about the patient corresponding to the identification information received from the application server 200. For example, the hospital management server 300 may receive identification information (name: Hong, Kil-dong, birth day: Jan. 1, 1990) from the application server 200, and obtain patient information corresponding to the identification information from the internal database of the hospital management server 300 or the EMR server 400. If the patient is a returning patient, the hospital management server 300 may obtain pre-stored patient information. When the patient is a new patient, the hospital management server 300 may obtain new patient information.

The step S922 of receiving the waiting person information may mean the operation of receiving the symptom information and the waiting number from the user terminal device 100. The waiting person information may include symptom information of a patient and a waiting number. The symptom information may be information input by the user interface 150 of the user terminal device 100, and the waiting person number may be information obtained from the hospital management server 300 or the reception management server 500. Although the hospital management server 300 receives the waiting number and the symptom information included in the waiting person information together, the hospital management server 300 may be implemented in the form of receiving the waiting number and the symptom information at different points in time in real time. The symptom information may be transmitted to the hospital management server 300 by various communication methods. For example, the symptom information may be transmitted to the hospital management server 300 based on near-field wireless communication (e.g., NFC communication).

The hospital management server 300 may combine the received symptom information and the waiting number. The meaning of combination may the operation of grouping the symptom information and the waiting number into one data group. The hospital management server 300 may receive a plurality of symptom information from the plurality of terminal devices. The hospital management server 300 may have to identify whether the plurality of symptom information corresponds to which patient, and the hospital management server 300 may perform identification based on the waiting number instead of the name of the patient. For example, the hospital management server 300 may group the waiting number #005 and the symptom information (wrist numbness) into one data group (waiting person information) and store the same in a memory of the hospital management server 300. The hospital management server 300 may transmit the grouped waiting person information to the display device 600 connected to the hospital management server 300. The display device 600 may be a personal computer (PC) of the doctor in charge.

The step S923 of mapping the patient information and the waiting person information may mean an operation of identifying patient information corresponding to the waiting person information. The hospital management server 300 may store a plurality of patient information, and may identify a plurality of patient information waiting for at least the treatment. Since the patient information includes personal identification information, it is possible to easily identify information corresponding to which patient among the plurality of patients. In that the waiting person information is composed of the waiting number and symptom information, it may be difficult to easily identify that the waiting person information belongs to which patient. The hospital management server 300 may perform an operation of determining whether the waiting person information belongs to which patient. Various mapping operations will be described in detail in FIGS. 21-24.

Figure 21:
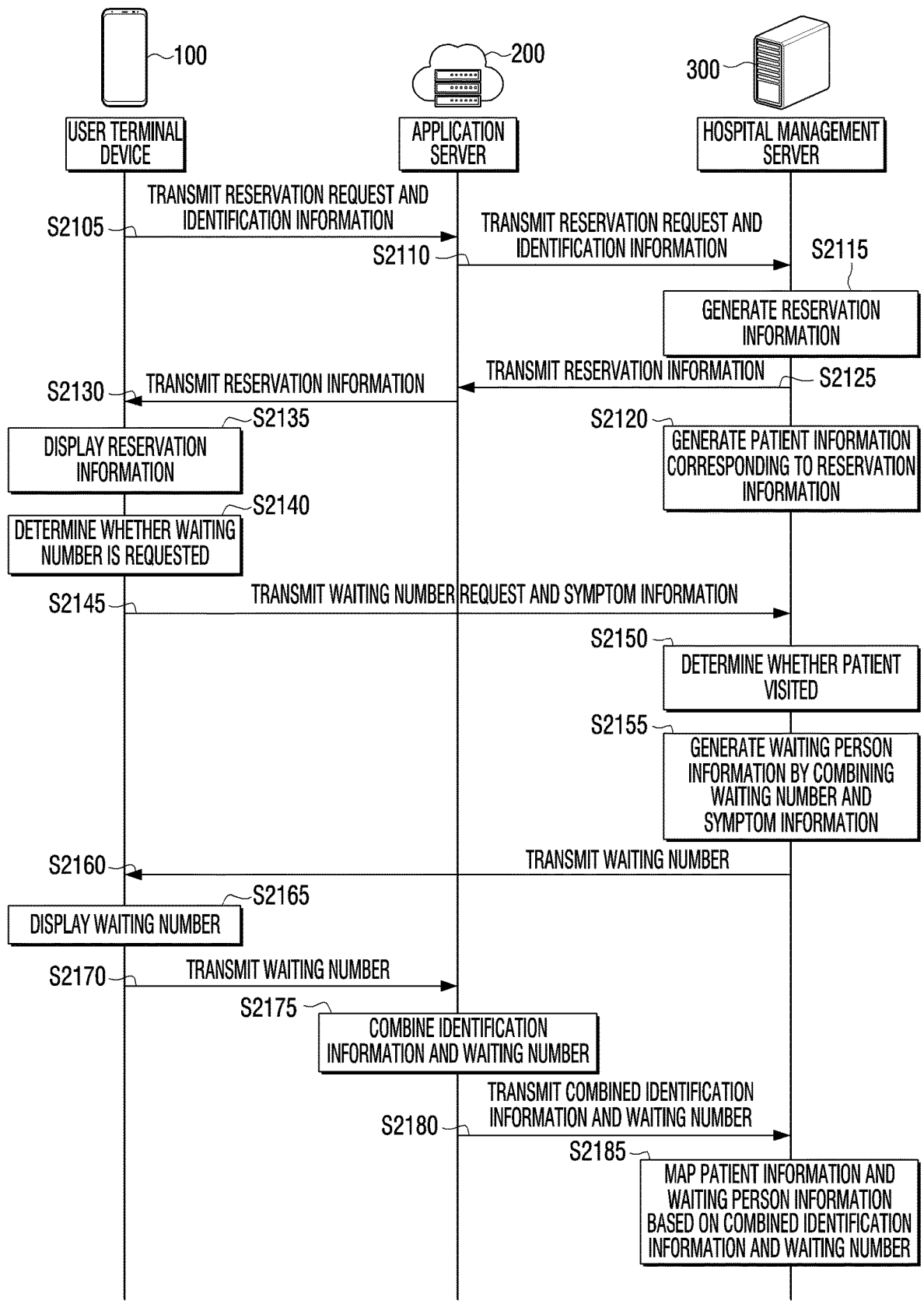
FIG. 21 is a diagram for illustrating an embodiment of mapping patient information and waiting person information.

FIG. 21 is a diagram for illustrating an embodiment of mapping patient information and waiting person information.

Referring to FIG. 21, S2105, S2110, S2115, S2120, S2125, S2130, S2135, S2140, S2145, S2150, S2155, S2160, and S2165 may correspond to S405, S410, S415, S420, S425, S430, S435, S440, S445, S450, S455, S460, and S465 of FIG. 4. Therefore, a duplicate description will be omitted.

The user terminal device 100 may receive the waiting number from the hospital management server 300, and may display the received waiting number on the display. The user terminal device 100 may transmit the received waiting number to the application server 200 in operation S2170. The application server 200 may combine the pre-stored identification information with the received waiting number in operation S2175. Here, the combining may mean that the identification information and the waiting number are grouped into one data group. The application server 200 may transmit the combined identification information and the waiting number to the hospital management server 300 in operation S2180. The hospital management server 300 may map the patient information and the waiting person information based on the combined identification information and the waiting number in operation S2185. The process of the mapping operation will be described in detail with reference to FIG. 22. When a coupling operation is performed in the application server 200, the agreement of the user may be necessary. A processing operation related to user agreement may be received through the user terminal device 100.

Figure 22:
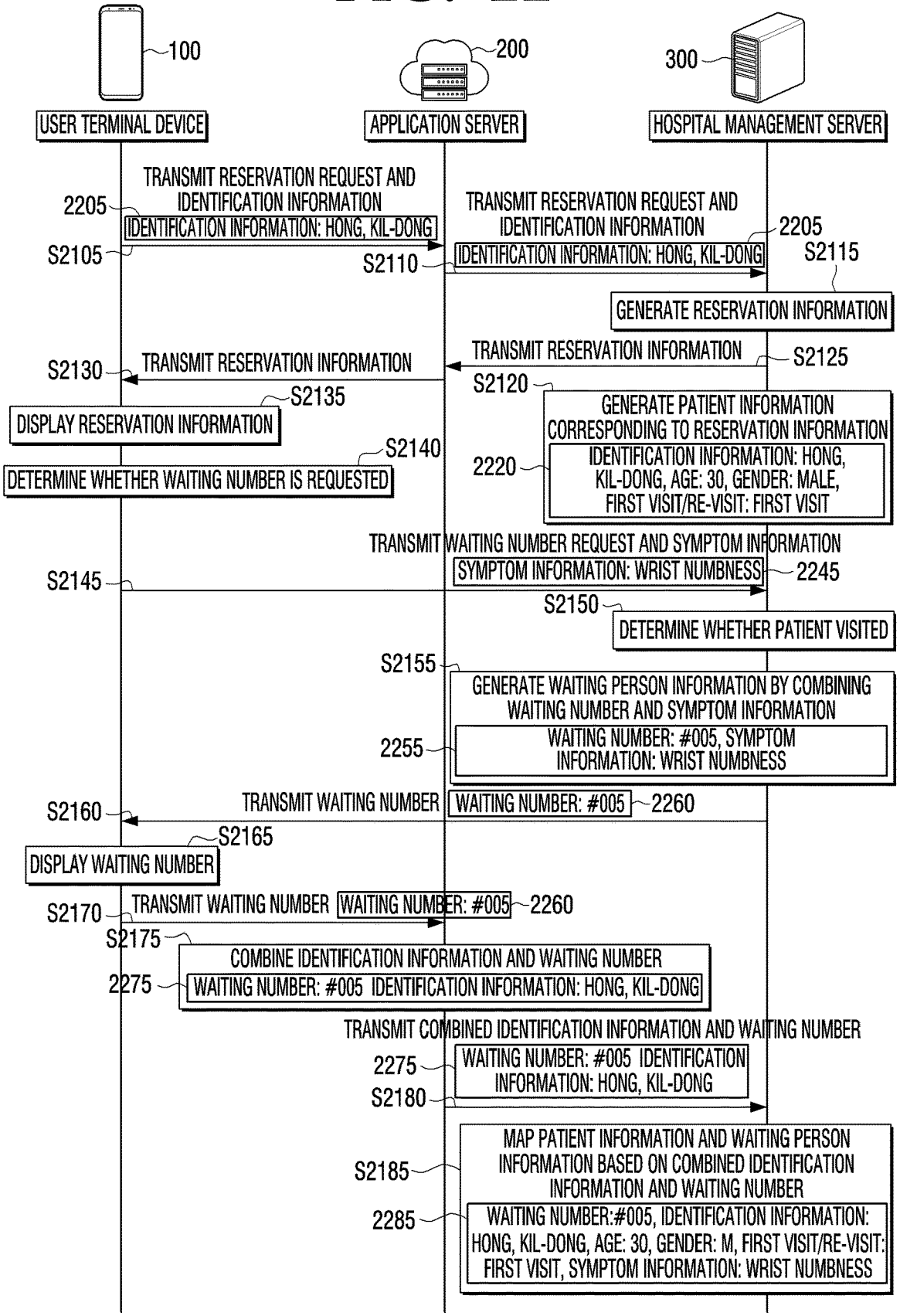
FIG. 22 is a diagram for detailing the information transmitted in the embodiment of FIG. 21.

FIG. 22 is a diagram for detailing the information transmitted in the embodiment of FIG. 21.

Referring to FIG. 22, the user terminal device 100 may transmit the reservation request and the identification information 2205 to the application server 200 in operation S2105. For example, the identification information 2205 may be a patient name, such as "Hong, Kil-dong." The application server 200 may transmit the received identification information 2205 to the hospital management server 300 in operation S2110.

The hospital management server 300 may generate reservation information based on the received identification information 2210. The hospital management server 300 may generate the patient information 2220 corresponding to the reservation information in operation S2120. The patient information 2220 may include at least one of identification information (e.g., Hong, Kil-dong), age (e.g., 30), gender (e.g., male), or first examination/re-examination (e.g., first examination). Here, it is possible to change first examination/re-examination to the new patient/returning patient.

The user terminal device 100 may transmit the waiting number request and the symptom information 2245 from the user terminal device 100 to the hospital management server 300 in operation S2145. The symptom information 2245 may include a portion of a body, such as a "wrist numbness" and details on the symptom.

The hospital management server 300 may determine whether a patient is visiting a hospital and provide a waiting number. The hospital management server 300 may combine the waiting number and the symptom information to generate the waiting person information 2255 in operation S2155. The waiting person information 2255 may include a waiting number (e.g., #005) and symptom information (e.g., a wrist numbness).

The hospital management server 300 may transmit the waiting number 2260 to the user terminal device 100 in operation S2160. The user terminal device 100 may transmit the waiting number 2260 to the application server 200.

The application server 200 may combine the identification information (or some information of the identification information) and the waiting number to generate the mapping reference data group 2275 in operation S2175. The application server 200 may transmit the generated mapping reference data group 2275 to the hospital management server 300 in operation S2180. The mapping reference data group may refer to a data group that is used for the mapping operation as reference information.

The hospital management server 300 may map the patient information 2220 and the waiting person information 2255. The hospital management server 300 may store a plurality of patient information and a plurality of waiting person information in a memory.

In the mapping operation, the hospital management server 300 may use a data group 2275 received from the application server 200. The hospital management server 300 may obtain the waiting number #005 included in the data group 2275 and obtain waiting person information 2255 corresponding to the waiting number #005 obtained from the plurality of waiting person information. The hospital management server 300 may obtain identification information (Hong, Kil-dong) included in the data group 2275 and obtain patient information 2220 corresponding to the identification information (Hong, Kil-dong) obtained from the plurality of patient information. The hospital management server 300 may map the obtained waiting person information 2255 and the obtained patient information 2220 to generate a new mapping result data group 285. The mapping result data group 2285 may include at least one of a waiting number (#005), identification information (Hong, Kil-dong), age (30), gender (male), new patient or returning patient (new patient), and symptom information (wrist numbness).

In the hospital treatment system 1000 of FIG. 22, symptom information is transmitted to the hospital management server 300 without passing through the application server 200. Despite the symptom information being combined with the waiting number, the patient information 2220 corresponding to the symptom information may be obtained based on the mapping reference data group 2275. Accordingly, in the hospital medical system 1000 of the disclosure, the symptom information may not be leaked even if the application server 200 is hacked.

Figure 23:
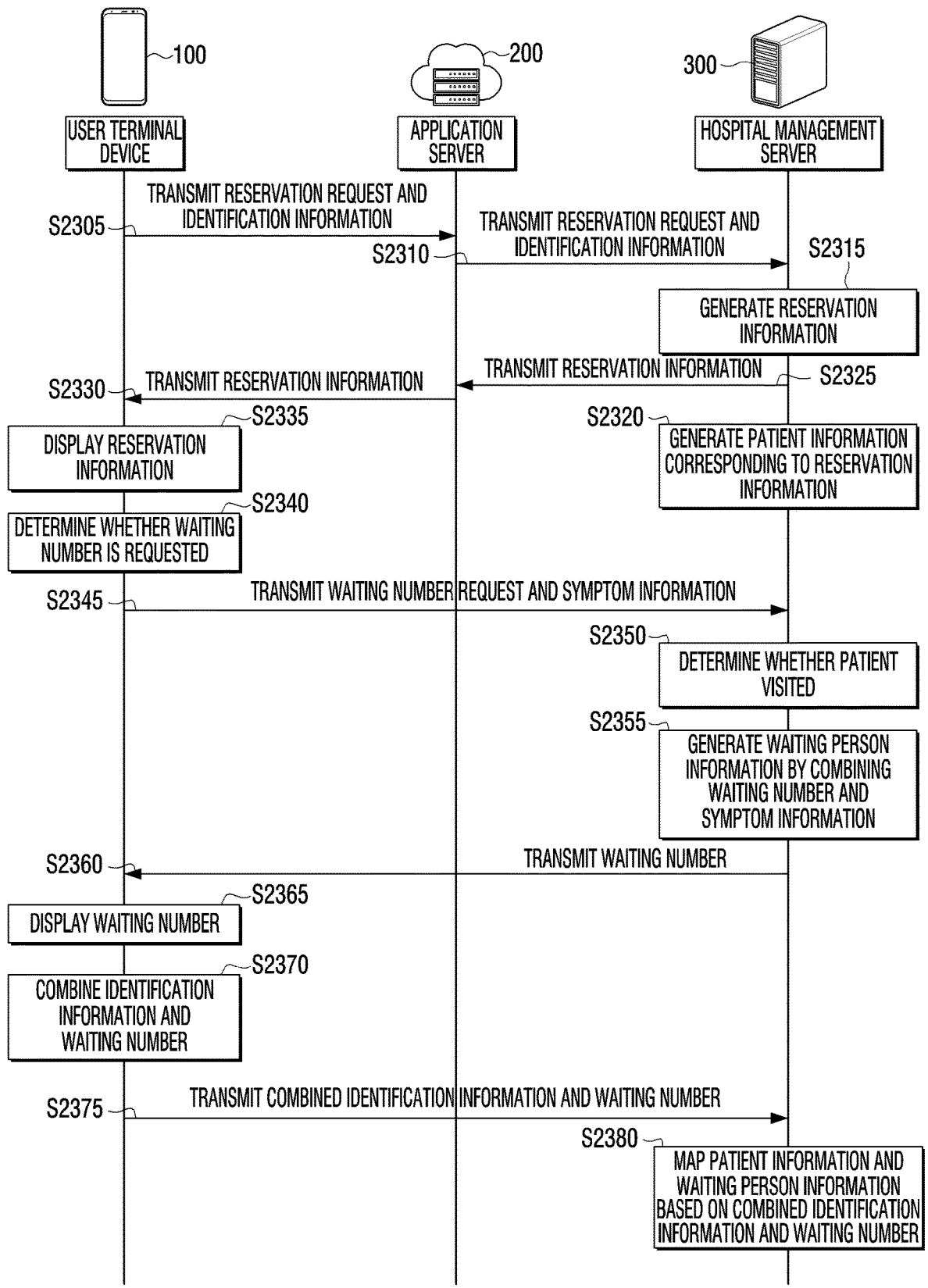
FIG. 23 is a diagram illustrating another embodiment of mapping patient information and waiting person information.

FIG. 23 is a diagram illustrating another embodiment of mapping patient information and waiting person information.

Referring to FIG. 23, S2305, S2310, S2315, S2320, S2325, S2330, S2335, S2340, S2345, S2350, S2355, S2360, and S2365 may correspond to S405, S410, S415, S420, S425, S430, S435, S440, S445, S450, S455, S460, and S465 of FIG. 4. Therefore, a duplicate description will be omitted.

The user terminal device 100 may receive the waiting number from the hospital management server 300 and display the received waiting number on the display. The user terminal device 100 may combine the received waiting number with the identification information previously stored in the internal memory to generate a mapping reference data group in operation S2370. Referring to FIGS. 21 and 22, the embodiment in which the operation of combining the waiting number and the identification information is implemented in the application server 200 is described. However, the operation of combining the waiting number and the identification information according to the embodiment may be performed in the user terminal device 100. The identification information may be stored in both the user terminal device 100 and the application server 200. When a coupling operation is performed in the user terminal device 100, the agreement of the user may be necessary.

The user terminal device 100 may transmit the combined identification information and the waiting number (mapping reference data group generated in S2370) to the hospital management server 300 in operation S2375. The hospital management server 300 may map the patient information and the waiting person information based on the combined identification information and the waiting number to generate a mapping result data group in operation S2380. The mapping operation will be described in detail with reference to FIG. 22.

Figure 24:
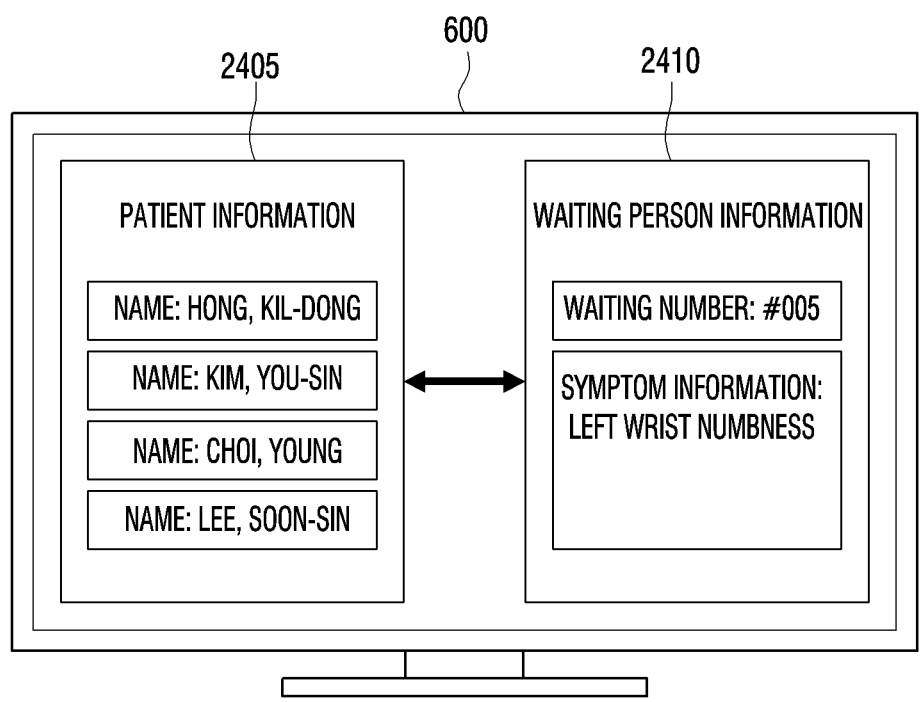
FIG. 24 is a diagram illustrating another embodiment of mapping patient information and waiting person information.

FIGS. 21 to 23 illustrate an embodiment of automatically mapping patient information and waiting person information in the hospital management server 300 using a mapping reference data group. However, according to another embodiment, the patient information and the waiting person information may be directly mapped by the doctor in charge without using a separate mapping reference data group. FIG. 24 illustrates an embodiment of directly mapping by the doctor in charge.

FIG. 24 is a diagram illustrating another embodiment of mapping patient information and waiting person information.

Referring to FIG. 24, the hospital management server 300 may be connected to the display device 600. The display device 600 may receive patient information and waiting person information from the hospital management server 300. The patient information is received from the hospital management server 300. However, according to an embodiment, the display device 600 may receive patient information directly from the EMR server 400.

The display device 600 may display the received patient information and the waiting person information on one screen at the same time. Specifically, the display device 600 may display patient information in a first area 2405 of one screen, and may display the waiting person information in a second area 2410 different from the first area 2405 of one screen.

The display device 600 may receive a plurality of patient information from the hospital management server 300. When plurality of patient information corresponding to the patients who are in the hospital after reception is completed is received from the hospital management server 300, the display device 600 may display name information among the identification information included in the plurality of patient information in the first area 2405. The patient information displayed in the first area may be plural, but the waiting person information displayed in the second area 2410 may be one. The hospital management server 300 may assign a waiting number based on at least one of a reception order or a treatment order, and a waiting number corresponding to at least one of a reception order or a treatment order may be one. Accordingly, the waiting person information transmitted from the hospital management server 300 to the display device 600 may be one. The waiting person information displayed on the second area 2410 of the display device 600 may be one.

The doctor in charge may directly map the patient information and the waiting person information displayed on the display device 600. Which patient information among the plurality of patient information corresponds to the waiting person information may be directly determined by the doctor in charge. The doctor in charge may know the identification information in the form of a face memory of a patient, or by directly asking a patient's name, birth date, or symptom information again, and may map the patient information and the waiting person information directly.

Figure 25:
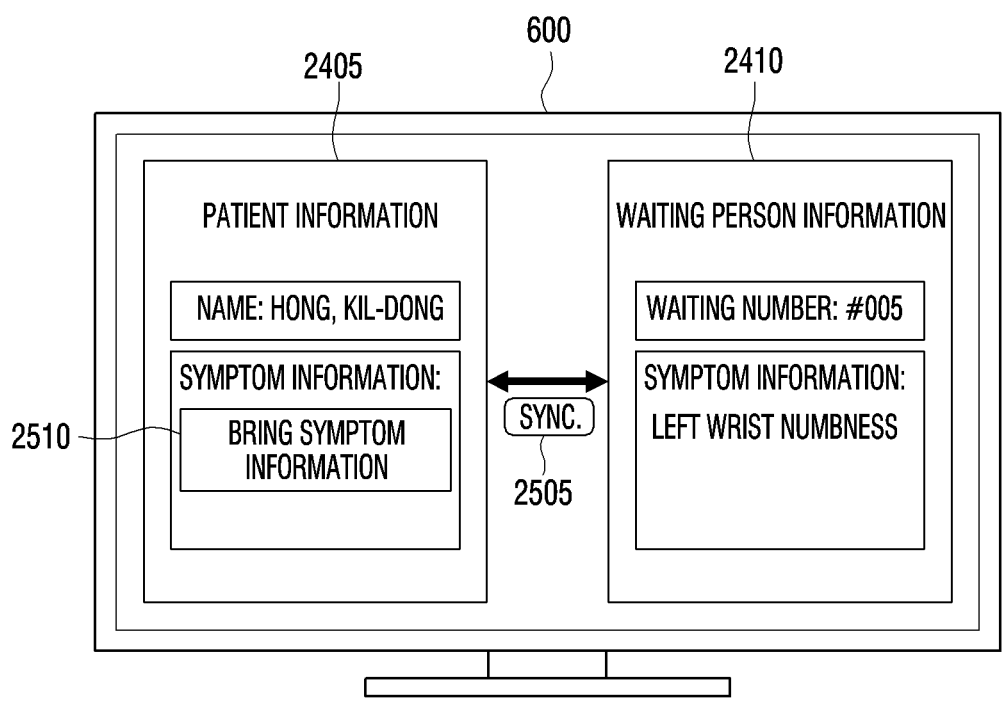
FIG. 25 is a diagram illustrating an embodiment of synchronizing symptom information.

FIG. 25 is a diagram illustrating an embodiment of synchronizing symptom information.

Referring to FIG. 25, the display device 600 may obtain one patient information and one waiting person information based on a mapping operation S 2185 from the hospital management server 300. A mapping result data group 2285 is generated in FIG. 22, but it is merely an operation according to an embodiment, and the mapping operation may refer to only mapping of specific patient information and specific waiting person information rather than generating a new data group. FIG. 25 illustrates an embodiment in which specific patient information and specific waiting person information are mapped to each other.

The display device 600 may receive the waiting person information corresponding to the treatment order from the hospital management server 300 and display the received waiting person information in the second area 2410. The display device 600 may receive the patient information mapped with the waiting person information from the hospital management server 300 and display the received patient information in the first area 2405.

Since the symptom information is included only in the waiting person information, the symptom information may be displayed only in the second area 2410. The display device 600 may display at least one UI of the UI 2505 or the UI 2510. The UI 2505 may be a UI corresponding to a function of synchronizing all of the items to be synchronized between the patient information and the waiting person information. When the display device 600 receives a user input for selecting the UI 2505, the display device 600 may perform synchronization operations on the synchronization target items. In FIG. 25, the synchronization item may be symptom information. In the embodiment illustrated in FIG. 25, the synchronization priority may be in the waiting person information. That is, since the symptom information of the patient information does not have data, and the symptom information of the waiting person information has data, that symptom information (left wrist numbness) of the waiting person information may also be included in the patient information. The display device 600 may display the symptom information (left arm numb) included in the patient information in the first area 2405.

The UI 2510 may be a UI corresponding to a function of synchronizing only a specific item, not all of the synchronization items. Although FIG. 25 shows that the synchronization item is one symptom information, synchronization items may be plural in implementation. The UI 2510 may be a UI corresponding to a function of synchronizing a particular item (symptom information) among the plurality of synchronization items.

Figure 26:
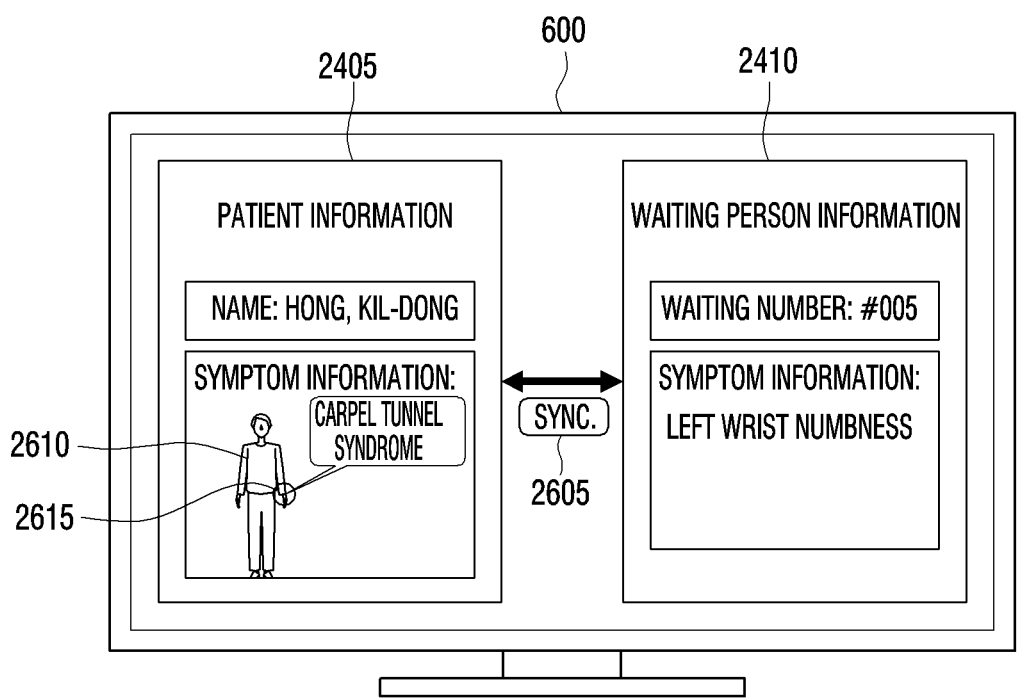
FIG. 26 is a diagram illustrating another embodiment of synchronizing symptom information.

FIG. 26 is a diagram illustrating another embodiment of synchronizing symptom information.

Referring to FIG. 26, the display device 600 may display a UI 2605 for synchronizing symptom information included in the waiting person information. If the UI 2605 is selected by the user, the display device 600 may analyze symptom information included in the waiting person information. The display device 600 may analyze the text of the symptom information to be classified into body information and pain information. For example, if the symptom information is "left arm numbness", the display device 600 may obtain body information (left wrist) and pain information (numbness) based on the symptom information. The display device 600 may display the UI 2610 of the human body model based on the obtained body information and the pain information. Specifically, a highlighting UI module 2615 may be displayed to easily recognize the position of the body information (left wrist) obtained by the UI 2610 of the human body model. Further, pain information (numbness) obtained near the corresponding location may be displayed. The display device 600 may convert the obtained pain information (numbness) into a medical term (carpel tunnel syndrome) and display the converted pain information (numbness). The operation of changing to the medical term may consider both body information and pain information.

Figure 27:
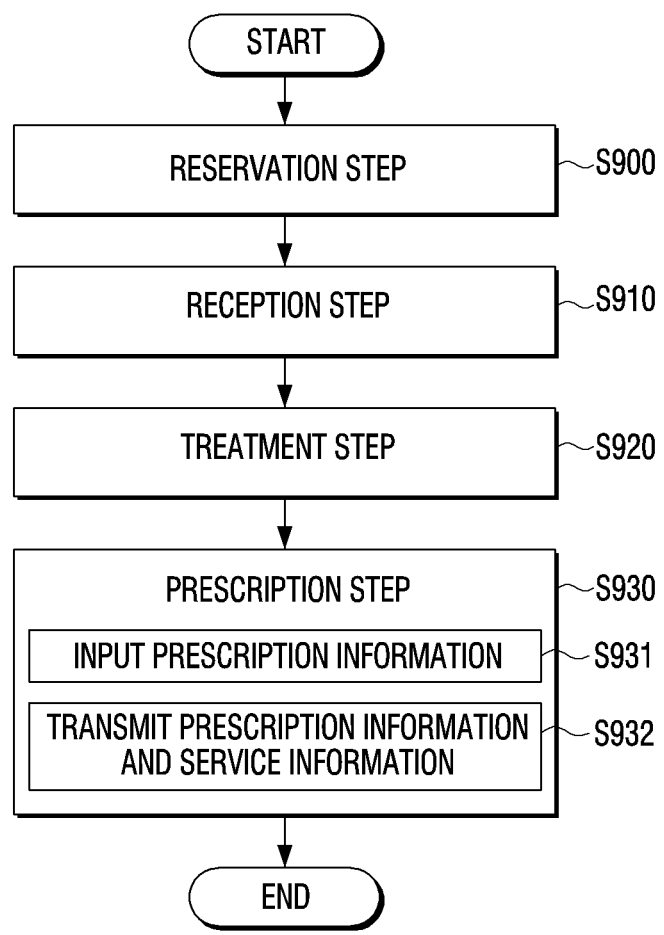
FIG. 27 is a flowchart illustrating the prescription step of a plurality of steps of managing a patient.

FIG. 27 is a flowchart illustrating the prescription step of a plurality of steps of managing a patient.

Referring to FIG. 27, the prescription step S930 may include inputting the prescription information in operation S931 and transmitting the transcription information and service information in operation S932.

The step S931 of inputting prescription information may mean the hospital management server 300 receiving prescription information of the doctor. The doctor in charge may input prescription information to the hospital management server 300 after examining the patient. For example, it is assumed that patient information and waiting person information are displayed on the display device 600 connected to the hospital management server 300. The doctor in charge may determine prescription by combining the patient information displayed on the display device 600, the waiting person information, and the information acquired through the examination process. A prescription result may be input to the display device 600 through a user interface connected to the display device 600. The information about the prescription result (prescription information) may be stored in the memory of the display device 600. The display device 600 may transmit the stored prescription information to the hospital management server 300.

In step S932, transmitting at least one of prescription information or service information may mean an operation of transmitting the prescription information input by the doctor in charge to the outside. The hospital management server 300 may transmit the received prescription information to the EMR server 400 or the user terminal device 100. When the EMR server 400 receives patient information including prescription information from the hospital management server 300, the EMR server 400 may write and update new patient examination contents to the patient sick record number. The patient information is passed to the EMR server 400, but all information included in the patient information may not be transmitted to the user terminal device 100, and at least one of prescription information or service information may be transmitted to the user terminal device 100.

The service information may mean a matter requiring attention by the patient. For example, the service information may include food to be avoided, type of exercise to be avoided, prescription dose, prescription medication time, reservation information, hospital visit recommendation date, and the like. Whether the hospital visit is reserved may mean notification of the result to the patient if the reservation time for next hospital visit is determined during the examination process. The hospital visit recommendation date may refer to a recommended date to visit to a hospital, although the reservation of the hospital visit has not been made. For example, the hospital management server 300 may transmit the service information "recommendation to visit a hospital after 2 to 3 days" to the user terminal device 100.

The hospital management server 300 may combine the prescription information and the waiting number to transmit at least one of prescription information or service information to the user terminal device 100. The combination operation may mean that the prescription information and the waiting number are grouped into one data group. The combining the prescription information and the waiting number may mean adding prescription information to the waiting person information.

The reason for combining the prescription information and the waiting number without combining the prescription information and the identification information is to make the prescription information to be difficult to know even if the prescription information is hacked. In general, the patient information transmitted to the EMR server 400 after treatment may be stored by grouping the identification information and prescription information into one data group. However, the EMR server 400 may be stored in a hospital internal system and stability may be secured in that a separate security program is operated. However, transmitting specific information to the user terminal device 100 may have a security risk in terms of transmitting information to an external system rather than an internal system.

Accordingly, in order to prevent this security threat, the hospital management server 300 may combine the prescription information and the waiting number without combining the prescription information and the identification information. The waiting person information may include only information about the user terminal 100, which does not include identification information, but simply assigns a waiting number.

The hospital management server 300 may map the waiting number assigned in the step of transmitting the waiting number to the user terminal device 100 and the user terminal device 100, and may store the mapped waiting number and the user terminal device 100 in the memory of the hospital management server 300. The hospital management server 300 may selectively transmit prescription information included in the waiting person information to the user terminal device 100 based on the mapped waiting number and the user terminal device 100. The hospital management server 300 may transmit service information along with the prescription information to the user terminal device 100.

The prescription step in operation S930 may be divided into first prescription information and second prescription information.

The first prescription information may mean first prescription information generated in a step before paying by a patient, and the second prescription information may mean prescription information generated in a step after paying by the patient.

The hospital management server 300 may transmit information related to the first prescription information and the payment to the user terminal device 100. The patient may perform payment based on the received first prescription information and information related to the payment. The first prescription information may be combined with the waiting number and transmitted to the user terminal device 100.

When the patient completes the payment in the user terminal device 100, the user terminal device 100 may transmit information that the payment has been completed to the hospital management server 300. According to another embodiment, the user terminal device 100 may transmit payment completion information to the hospital management server 300 through the application server 200.

The hospital management server 300 may receive payment completion information and generate second prescription information. The hospital management server 300 may finally transmit the second prescription information to the user terminal device 100. The second prescription information may be combined with the waiting number and transmitted to the user terminal device 100. The hospital management server 300 may transmit the second prescription information and service information corresponding to the second prescription information to the user terminal device 100.

For example, the first prescription information is assumed to a treatment and physical treatment. The hospital management server 300 may transmit the first prescription information to the user terminal device 100.

The hospital management server 300 may transmit prescription information or service information to the user terminal device 100 after a threshold time or more since the patient is distant from the hospital by a threshold distance or more or a preset time point (a point at which treatment is completed, payment is completed, or a patient is distant from the hospital by a threshold distance or more from the hospital).

Figure 28:
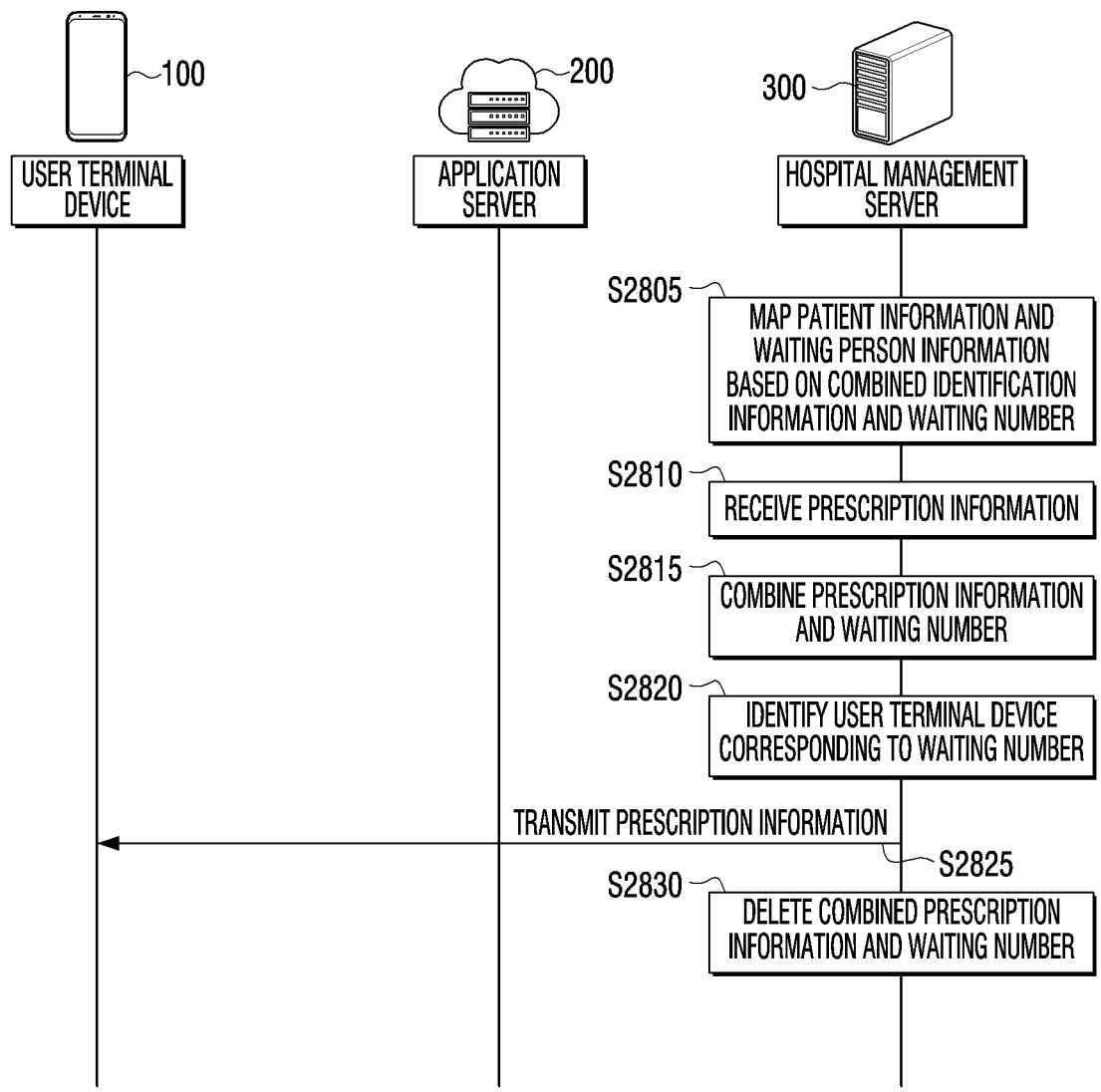
FIG. 28 is a diagram illustrating the steps for transmitting prescription information.

FIG. 28 is a diagram illustrating the steps for transmitting prescription information.

Referring to FIG. 28, the hospital management server 300 may map the patient information and the waiting person information based on the combined identification information and the waiting number in operation S2805. The operation of mapping patient information and waiting person information has been described with reference to FIGS. 21 to 24, and thus a detailed description thereof will be omitted.

The hospital management server 300 may receive prescription information after mapping the patient information and the waiting person information in operation S2810. The hospital management server 300 may combine the received prescription information and the waiting number in operation S2815. Here, combining the prescription information and the waiting number may mean adding prescription information to the waiting person information to generate one data group. The generated data group may be changed waiting person information. The changed waiting person information may include prescription information and a waiting number. The hospital management server 300 may identify the user terminal device 100 corresponding to the waiting number based on the changed waiting person information in operation S2820. The hospital management server 300 may transmit prescription information to the identified user terminal device 100 in operation S2825. According to another embodiment, the hospital management server 300 may transmit prescription information to the application server 200 and transmit prescription information to the user terminal device 100 in the application server 200. The hospital management server 300 may delete the combined prescription information and the waiting number after a threshold time elapses in operation S2830. Since patient information is separately stored in relation to the patient's medical record, the hospital management server 300 may not need to store the combined prescription information and the waiting number in the memory. It is described that the prescription information is deleted after the threshold time has elapsed in S2830, the hospital management server 300 may delete the prescription information and the waiting number immediately after transmitting the prescription information to the user terminal device 100.

The waiting number may additionally include date information. The hospital management server 300 may compare the date information included in the waiting number to the date information identified by the hospital management server 300. If the date information included in the waiting number is earlier than the date of the current hospital management server 300, the hospital management server 300 may delete the waiting number.

FIG. 28 is described based on an embodiment of FIGS. 3 and 4 in which the hospital management server 300 stores and manages prescription information, patient information, and waiting person information. According to an embodiment, an operation related to the prescription information is applicable to the embodiment of FIGS. 5 to 8.

The patient treatment system 1000 may include the user terminal device 100, the application server 200, the hospital management server 300, the EMR server 400, the reception management server 500, and the display device 600.

The display device 600 may refer to a device connected to the hospital management server 300, and may refer to a device managed by the doctor in charge. The display device 600 may further include a user interface (e.g., a keyboard and a mouse), and may receive prescription information of the doctor by means of a user interface. The display device 600 may add the received prescription information to the patient information and the waiting person information. Although the prescription information is not input to the existing patient information and the waiting person information, the display device 600 may add the received prescription information to the patient information and the waiting person information. The patient information and the waiting person information may be changed by adding prescription information. The patient information and the waiting person information after the prescription information is added is described as changed patient information and the changed waiting person information. The changed patient information may include at least one of symptom information of the patient, prescription information of the patient, or identification information of the patient. At least one of symptom information of a patient, a waiting number of a patient, or prescription information of a patient may be included in the changed waiting person information. The changed waiting person information may correspond to step S2815 of FIG. 28.

The display device 600 may transmit the changed patient information and the changed waiting person information to the hospital management server 300. The hospital management server 300 may transmit the changed patient information to the EMR server 400. The EMR server 400 may store updated patient information in a memory.

The hospital management server 300 may transmit the changed waiting person information to the reception management server 500. The reception management server 500 may receive the changed waiting person information, and may identify a waiting number in the changed waiting person information. The reception management server 500 may identify a user terminal device corresponding to the waiting number. The reception management server 500 may generate device information for mapping the waiting number and the user terminal device in the step of assigning the waiting number and store the device information in the memory. The reception management server 500 may identify the user terminal device 100 corresponding to the waiting number identified in the changed waiting person information from a plurality of device information. The prescription information included in the changed waiting person information may be transmitted to the identified user terminal device 100.

Figure 29:
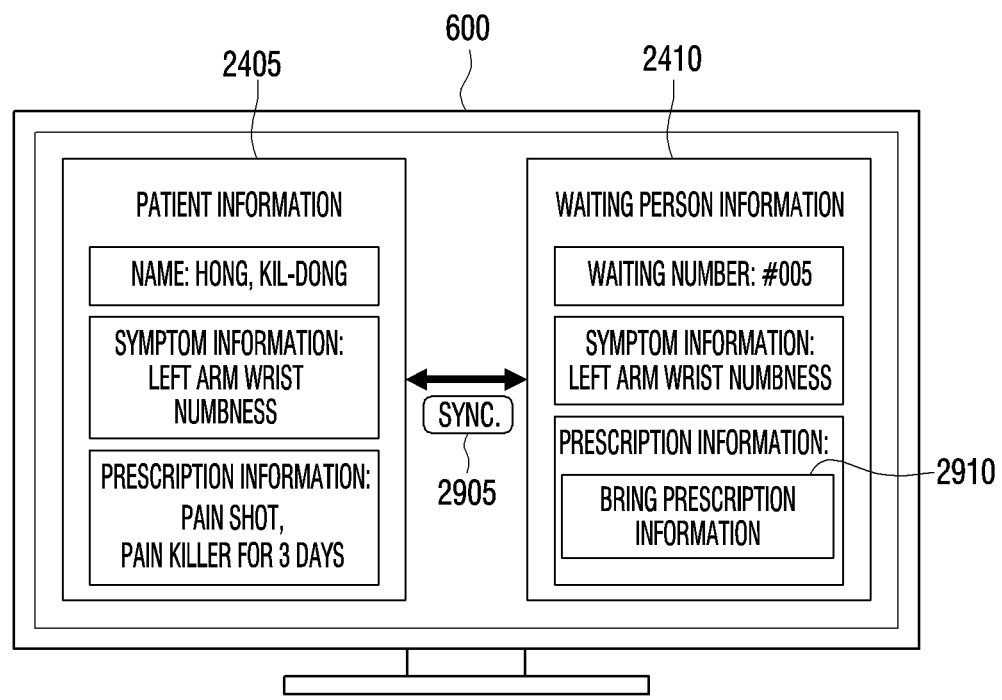
FIG. 29 is a diagram illustrating an embodiment of synchronizing prescription information.

FIG. 29 is a diagram illustrating an embodiment of synchronizing prescription information.

Referring to FIG. 29, the display device 600 may indicate a UI 2905 that synchronizes prescription information. When the display device 600 receives prescription information of the doctor, the display device 600 may display the received prescription information in the first area 2405. The display device 600 may display the prescription information displayed on the first area 2405 in the second area 2410 when the input of the doctor selecting the UI 2905 is received.

The display device 600 may display the UI 2910 for synchronizing only the prescription information on the second area 2410. The display device 600 may display all prescription information displayed in the first area 2405 in the second area 2410 when an input of the doctor to select the UI 2910 is received.

The display device 600 may update the existing patient information by adding the received specific prescription information to the patient information. Updated patient information is described as changed patient information. The display device 600 may add prescription information (pain shot, pain killer for 3 days, etc.) included in the changed patient information to the waiting person information when the input of the doctor selecting the UI 2905 or the UI 2910 is received. Waiting person information including the added prescription information is described as the changed waiting person information.

Figure 30:
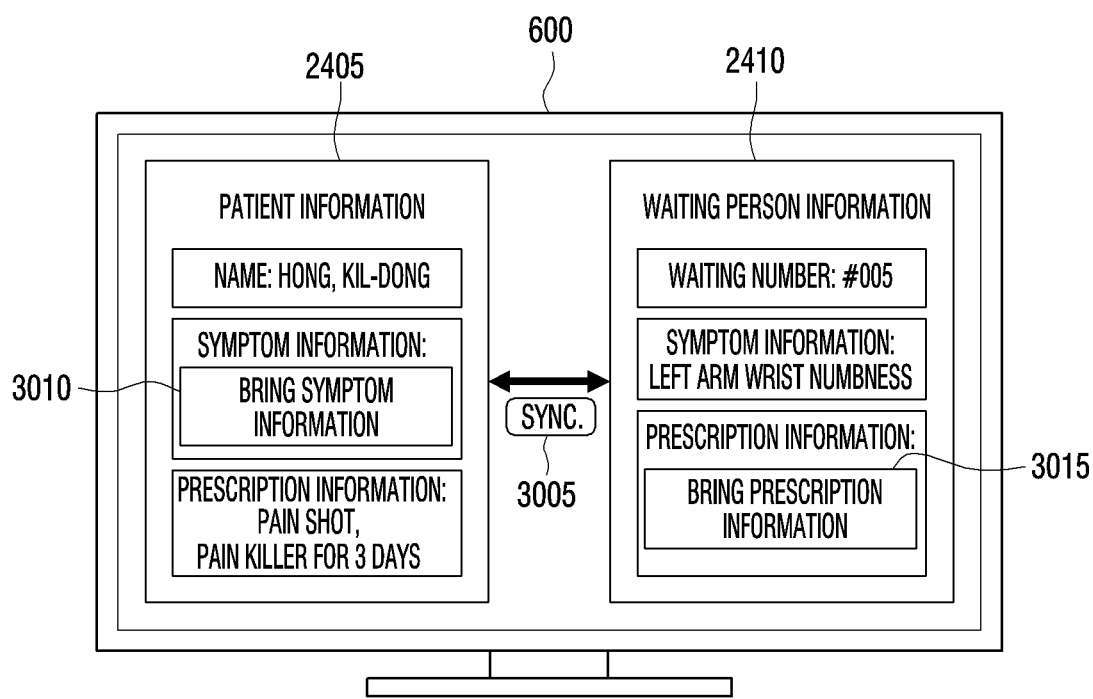
FIG. 30 is a diagram illustrating an embodiment of synchronizing symptom information and prescription information.

FIG. 30 is a diagram illustrating an embodiment of synchronizing symptom information and prescription information.

Referring to FIG. 30, the display device 600 may display at least one of a UI 3005 synchronizing both symptom information and prescription information, a UI 3010 synchronizing only the symptom information, or a UI 3015 synchronizing only prescription information.

When input of the doctor selecting the UI 3005 is received, the display device 600 may add the symptom information included in the waiting person information to the patient information and may add the prescription information included in the patient information to the waiting person information.

When input of the doctor selecting the UI 3010 is received, the display device 600 may add only the symptom information included in the waiting person information to the patient information.

When input of the doctor selecting the UI 3015 is received, the display device 600 may add only the prescription information included in the patient information to the waiting person information.

The embodiment of FIG. 30 providing various synchronization UIs include an operation to synchronize at least one of the symptom information or prescription information according to selection of the doctor and thus, data management by the doctor may be easy.

Figure 31:
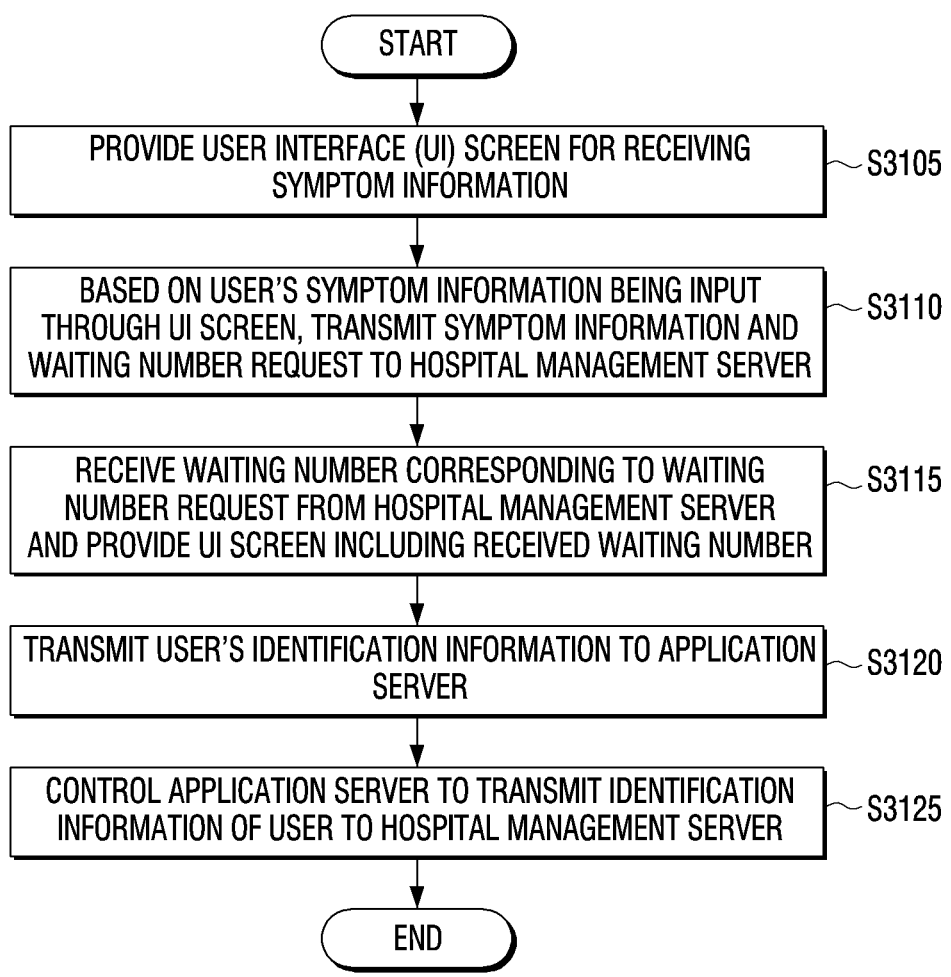
FIG. 31 is a flowchart illustrating a control method of a user terminal device according to an embodiment of the disclosure.

FIG. 31 is a flowchart illustrating a control method of a user terminal device according to an embodiment of the disclosure.

Referring to FIG. 31, an application stored in a computer-readable medium and executes an operation of a user terminal device 100, wherein the operation includes providing a user interface (UI) screen for receiving symptom information in operation S3105; based on a user's symptom information being input through the UI screen, transmitting the symptom information and a waiting number request to the hospital management server 300 in operation S3110; receiving a waiting number corresponding to the waiting number request from the hospital management server 300 and providing the UI screen including the received waiting number in operation S3115, transmitting user's identification information to the application server 200 in operation S3120 and controlling the application server 200 to transmit the identification of the user to the hospital management server 300 in operation S3125.

The first UI screen including symptom information transmitted to the hospital management server 300 and the second UI screen including the identification information of a user may be provided to the display device 600 communicating with the hospital management serve 300.

The operation may further include providing a UI screen for hospital reservation; based on receiving a reservation request through the UI screen, transmitting, to the application server 200, the user's identification information and the information for hospital reservation, and based on receiving hospital reservation information from the application server 200, providing a UI screen including the received hospital reservation information, and the reservation information may include a reservation time.

The operation may further include transmitting, to the hospital management server 300, location information of the user terminal device 100 prior to a threshold time from the reservation time; and based on receiving a waiting number corresponding to the location information from the hospital management server 300, providing a UI screen including the received waiting number.

The a hospital management server 300, based on the location information being within a threshold distance from the location of the hospital, may provide a waiting number with a high priority to the user terminal device 100.

The operation may further include transmitting the received waiting number to the application server 200 and controlling the application server 200 to transmit a waiting number to the hospital management server 300, and the first UI screen including the symptom information and the waiting number transmitted to the hospital management sever 300 and the second UI screen including the user's identification information and the waiting number may be provided to the display device 600 communicating with the hospital management server 300.

The operation may further include receiving prescription information from the hospital management server 300; and providing a UI screen including the received prescription information, and the hospital management server 300 may identify a terminal device for transmitting the prescription information based on the waiting number, and transmit the prescription information to the identified terminal device 100.

The hospital management server 300 may include a first hospital management server and a second hospital management server, the symptom information and the waiting number request may be transmitted to the first hospital management server, and the user's identification information may be transmitted to the second hospital management server.

The symptom information may be transmitted to the hospital management server 300 through a first communication module and the user's identification information may be transmitted to the hospital management server 300 through the second communication module.

The operation may further include receiving prescription information from the hospital management server 300; and providing a UI screen including the received prescription information, and the prescription information may be received from the hospital management server 300 through the first communication module.

The application operation as FIG. 31 may be executed by the electronic apparatus having the configuration as illustrated in FIG. 1 or FIG. 2, and by an electronic apparatus having other configurations.

Methods according to the embodiments as described above may be implemented as an application format installable in an existing electronic apparatus.

Methods according to the various example embodiments as described above may be implemented as software upgrade or hardware upgrade for an existing electronic apparatus.

Various example embodiments described above may be performed through an embedded server provided in an electronic apparatus, or an external server of at least one electronic apparatus and a display device.

Meanwhile, various embodiments may be implemented in software, including instructions stored on machine-readable storage media readable by a machine (e.g., a computer). An apparatus may call instructions from the storage medium, and execute the called instruction, including an electronic apparatus according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

The method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) mentioned above may include a single entity or a plurality of entities. At least one element or operation from of the corresponding elements mentioned above may be omitted, or at least one other element or operation may be added. Alternatively or additionally, some components (e.g., module or program) may be combined to form a single entity. In this case, the integrated entity may perform functions of at least one function of an element of each of the plurality of elements in the same manner as or in a similar manner to that performed by the corresponding element from of the plurality of elements before integration. The module, a program module, or operations executed by other elements according to embodiments may be executed consecutively, in parallel, repeatedly, or heuristically, or at least some operations may be executed according to a different order, may be omitted, or the other operation may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A system for enhancing secure patient data management in a distributed computing environment, the system comprising:
    a terminal device, an application server, and a hospital management server,
    wherein the terminal device is configured to transmit a reservation request and user's identification information to the application server using a second communication module,
    wherein the application server is configured to transmit the reservation request and the user's identification information received from the terminal device to a hospital management server,
    wherein the hospital management server is configured to generate patient information including the user's identification information based on the reservation request and the user's identification information received from the application server, and stores the patient information,
    wherein the terminal device is further configured to
        display a user interface (UI) screen for receiving symptom information, the UI screen presenting a plurality of user-selectable predefined symptom category representations and a direct text input field, and
        based on receiving the user's selection via interaction with one of the predefined symptom category representations or the direct text input field through the UI screen, transmit the indicated the symptom information and a waiting number request directly to the hospital management server using a first communication module configured for secure transmission of sensitive health data, wherein the transmission of the symptom information using the first communication module bypasses the application server to prevent exposure of the symptom information to the application server, wherein the hospital management server is further configured to generate a waiting number based on the waiting number request received directly from the terminal device via the first communication module, and transmit the generated waiting number to the terminal device, wherein the hospital management server is further configured to generate waiting person information comprising the symptom information and the generated waiting number but specifically excluding not including the user's identification information, by combining the symptom information received directly from the terminal device and the generated waiting number, and store the waiting person information to maintain separation between symptom data and user identification data within the hospital management server before mapping, wherein the terminal device is further configured to receive the generated waiting number from the hospital management server, display a UI screen including the received waiting number, and transmit the received waiting number to the application server using the second communication module, wherein the application server is further configured to combine the waiting number and the user's identification information received from the terminal device and transmit the combined information to the hospital management server, and wherein the hospital management server is further configured by executable instructions stored in non-transitory memory to perform operations comprising:
  obtaining the patient information corresponding to the user's identification information received from the application server among a plurality of patient information stored in the hospital management server,
  obtaining the waiting person information corresponding to the waiting number received from the application server among a plurality of stored waiting person information entries,
  generating a mapping result data group by mapping the patient information and the waiting person information based on the combined information received from the application server,
  based on receiving prescription information corresponding to the symptom information contained within the mapped waiting person information, combining the prescription information and the waiting number into a secure data packet associated only with the waiting number and excluding user identification information,
  identifying the terminal device corresponding to the waiting number from a plurality of device information mapped to the plurality of waiting numbers and a plurality of terminal devices, and
  selectively controlling transmission of the secure data packet containing the prescription information directly to the identified terminal device via the first communication module, such that transmission bypasses the application server, of thereby preventing transmission of prescription information through the application server.

2. The system of claim 1, wherein the hospital management server provides a first UI screen including the symptom information transmitted to the hospital management server based on the mapped patient information and the waiting person information and a second UI screen including the user's identification information are provided to a display device communicating with the hospital management server.

3. The system of claim 1, wherein the terminal device displays a UI screen for hospital reservation,
  based on receiving a reservation request through the UI screen for hospital reservation, transmits, to the hospital management server, the reservation request and the user's identification information,
  wherein the application server transmits the reservation request and the user's identification received from the terminal device to a hospital management server,
  wherein the hospital management server, based on receiving hospital reservation information from the hospital management server, generates the patient information and hospital reservation information, and
  transmits the generated hospital reservation information to the application server,
  wherein the application server transmits the hospital reservation information to the terminal device,
  wherein the terminal device, based on receiving hospital reservation information from the hospital management server, displays a UI screen including the received hospital reservation information, and
  wherein the reservation information includes a reservation time.

4. The system of claim 3, wherein the terminal device transmits, to the hospital management server, location information of the terminal device prior to a threshold time from the reservation time; and
  based on receiving a waiting number corresponding to the location information from the hospital management server, displays a UI screen including the received waiting number.

5. The system of claim 4, wherein the hospital management server, based on the location information being within a threshold distance from the location of the hospital, provides a waiting number with a high priority to the terminal device.

6. The system of claim 1, wherein the hospital management server provides a first UI screen including the symptom information and the waiting number based on the mapped patient information and the waiting person information and a second UI screen including the user's identification information and the waiting number to a display device communicating with the hospital management server.

7. The system of claim 1, wherein the hospital management server comprises a first hospital management server and a second hospital management server,
  wherein the symptom information and the waiting number request are transmitted to the first hospital management server, and
  wherein the user's identification information is transmitted to the second hospital management server.

8. The system of claim 1, wherein the terminal device receives prescription information from the hospital management server, and
  displays a UI screen including the received prescription information, and
  wherein the prescription information is received from the hospital management server through the first communication module.

* * * * *